United States Patent
Cao et al.

(10) Patent No.: US 11,425,723 B2
(45) Date of Patent: Aug. 23, 2022

(54) TRANSMISSION PATTERN INDICATION AND SELECTION FOR SIDELINK GRANT FREE TRANSMISSION

(71) Applicant: Huawei Technologies Co., Ltd., Shenzhen (CN)

(72) Inventors: Yu Cao, Kanata (CA); Amine Maaref, Ottawa (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 200 days.

(21) Appl. No.: 16/737,170

(22) Filed: Jan. 8, 2020

(65) Prior Publication Data
US 2020/0229173 A1 Jul. 16, 2020

Related U.S. Application Data

(60) Provisional application No. 62/791,722, filed on Jan. 11, 2019.

(51) Int. Cl.
*H04W 72/04* (2009.01)
*H04W 36/00* (2009.01)
(Continued)

(52) U.S. Cl.
CPC ......... *H04W 72/048* (2013.01); *H04W 28/26* (2013.01); *H04W 36/0055* (2013.01); *H04W 72/02* (2013.01); *H04W 72/044* (2013.01)

(58) Field of Classification Search
CPC ............. H04W 72/048; H04W 72/044; H04W 36/0055; H04W 28/26; H04W 72/02; H04W 74/0816
See application file for complete search history.

(56) References Cited

U.S. PATENT DOCUMENTS

2018/0014345 A1 1/2018 Sartori et al.
2018/0049129 A1* 2/2018 Li .................... H04W 74/0816
(Continued)

FOREIGN PATENT DOCUMENTS

CN 106797635 A 5/2017
WO 2018067400 A1 4/2018
(Continued)

OTHER PUBLICATIONS

Final Report of 3GPP TSG RAN WG1 #95 v1.0.0, , Spokane, USA, Nov. 12-16, 2018, 3GPP TSG RAN WG1 Meeting #96, R1-1901482, Athens, Greece, Feb. 25-Mar. 1, 2019.
(Continued)

*Primary Examiner* — Ivan O Latorre
(74) *Attorney, Agent, or Firm* — Slater Matsil, LLP

(57) ABSTRACT

With sidelink reservation signals sent together with the sidelink data, there is the possibility of interference with other sidelink signals. In order to address this, systems and methods are provided in which a first UE transmits a reservation signal to indicate at least one time-frequency resource for transmitting sidelink data. Following this, the first UE transmits at least one sidelink data transmission to a second UE using the at least one time-frequency resource indicated by the reservation signal. The reservation signal is transmitted before the at least one sidelink data transmission signal so that a third UE may detect the reservation signal and use the reservation signal to avoid using the at least one time-frequency resource indicated in the reservation signal.

24 Claims, 14 Drawing Sheets

(51) Int. Cl.
   *H04W 28/26*  (2009.01)
   *H04W 72/02*  (2009.01)

(56) References Cited

U.S. PATENT DOCUMENTS

| | | | |
|---|---|---|---|
| 2018/0324842 A1 | 11/2018 | Gulati et al. | |
| 2019/0200377 A1* | 6/2019 | Li | H04W 72/12 |
| 2019/0387377 A1* | 12/2019 | Zhang | H04W 52/367 |
| 2020/0022181 A1* | 1/2020 | Li | H04W 24/10 |
| 2020/0305176 A1* | 9/2020 | Hu | H04W 72/1263 |

FOREIGN PATENT DOCUMENTS

| | | | |
|---|---|---|---|
| WO | 2018201384 A1 | 11/2018 | |
| WO | WO-2019028759 A1 * | 2/2019 | H04L 25/022 |
| WO | WO-2020033226 A1 * | 2/2020 | H04W 4/40 |

OTHER PUBLICATIONS

Nokia: "On Sidelink Resource Allocation", 3GPP TSG RAN WG1 Meeting #95, R1-1813522, Spokane, USA, Nov. 12-16, 2018, total 6 pages.

Nokia: "On Sidelink Resource Allocation", 3GPP TSG RAN WG1 Meeting #94bis, R1-1811429, Chengdu, China, Oct. 8-12, 2018, total 4 pages.

* cited by examiner

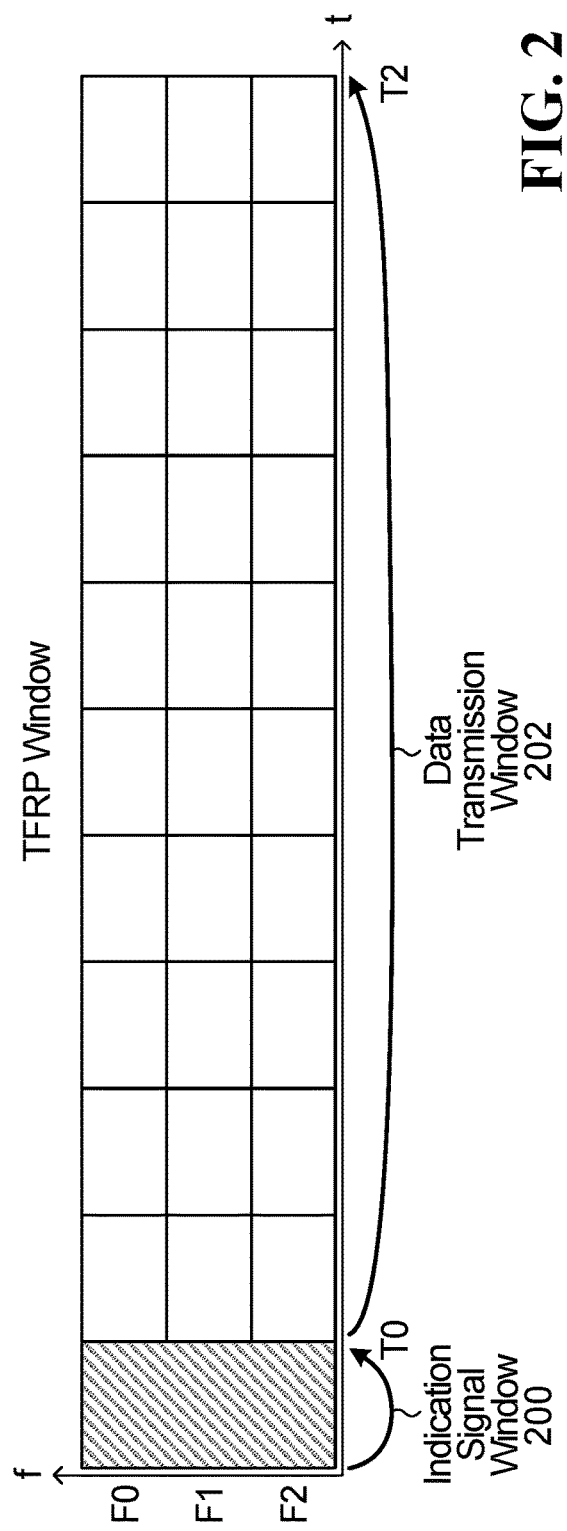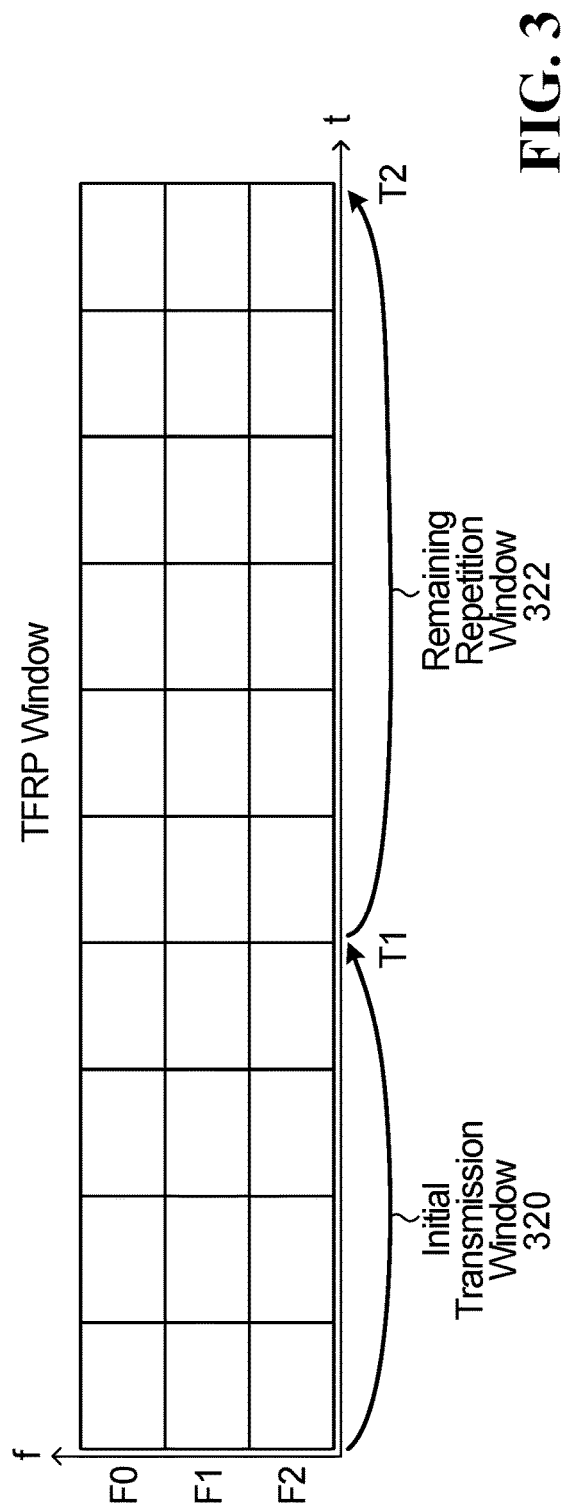

| Index for 3-tuple | {P1} Initial | {P2} 1 reT | {P3} 2 reT |
|---|---|---|---|
| 1 | P11 | P21 | P31 |
| 2 | P12 | P22 | P32 |
| 3 | P13 | P23 | P33 |

FIG. 10

TRANSMISSION PATTERN INDICATION AND SELECTION FOR SIDELINK GRANT FREE TRANSMISSION

CROSS REFERENCE TO RELATED APPLICATION

This application claims the benefit of U.S. Provisional Patent Application No. 62/791,722 filed Jan. 11, 2019, which is incorporated in its entirety herein by reference.

FIELD

The application relates to systems and methods of selecting and indicating transmission patterns for sidelink grant free transmission.

BACKGROUND

Vehicle to everything (V2X) refers to a category of communications scenarios (along with their corresponding technical challenges), including communication between a vehicle and another vehicle (V2V), vehicle to infrastructure (V2I), vehicle to pedestrian (V2P), and many other scenarios. In V2X, the transmission can be done through a link between network and user equipment (UE), such as uplink (UL) and downlink (DL) or a sidelink between UE and UE (SL). UE cooperation can be used to enhance the reliability, throughput, and capacity of V2X communications, as well as next generation wireless communications in general.

LTE V2X: In Long Term Evolution (LTE), a conventional V2X transmission scheme relies on the concept of a transmit resource pool (RP). The conventional LTE V2X transmission scheme includes two transmission modes: mode 3 and mode 4. In mode 3, a base station (BS) schedules time-frequency resources (from the UE's RP) for SL transmission using downlink control information (DCI), either dynamically or semi-persistently. In mode 4, a UE randomly selects resources within its transmit RP. A UE may also reselect resources based on previous measurement and sensing results.

The conventional resource pool approach has downsides and limitations. For example, the scheduling in mode 3 results in scheduling-related limitations, such as latency and having the SL transmission rely on DCI. For another example, when the UE autonomously selects resources in mode 4, there can be a collision or conflict with the same resource being selected by another UE.

NR-V2X: In New Radio (NR) Release16, the following agreement has been reached for Mode 2:

- For out of coverage operation, Mode-2(c) assumes (pre)-configuration of single or multiple sidelink transmission patterns (patterns are defined on each sidelink resource pool);
- For in-coverage operation, Mode-2(c) assumes that gNB configuration indicates single or multiple sidelink transmission patterns (patterns are defined on each sidelink resource pool);
- If a single pattern is configured to a transmitting UE there is no sensing procedure executed by the UE;
- If multiple patterns are configured to a transmitting UE there is a possibility of a sensing procedure executed by the UE;
- Pattern is defined in terms of the size of the resource in time and frequency, Position(s) of the resource in time and frequency, and the number of resources; and NR's UL grant-free transmission is called "configured grant UL transmission" or "UL transmission without dynamic scheduling." It includes two types. For configured grant Type 1, a resource is configured by radio resource control (RRC) signaling. For configured grant Type 2, a resource is configured by a combination of RRC signaling and DCI signaling. Configured grant type 1 transmission is mainly used for uplink transmission, which means the base station that configured the resource is also the receiver. Therefore, the receiver (the BS) knows all the configuration of the configured grant UE.

SUMMARY

According to one aspect of the present disclosure, there is provided a method comprising: transmitting, by a first user equipment (UE) to a second UE, a first reservation signal to indicate at least one time-frequency resource for transmitting sidelink data; transmitting, by the first UE to the second UE, at least one sidelink data transmission using the at least one time-frequency resource indicated by the first reservation signal; wherein the first reservation signal is transmitted before the at least one sidelink data transmission signal so that a third UE may detect the first reservation signal and use the first reservation signal to avoid using the at least one time-frequency resource indicated in the first reservation signal.

Optionally, wherein the at least one time-frequency resource is at least two time-frequency resources in different time slots, and the at least one sidelink data transmission is at least two sidelink data transmissions, each of the time-frequency resources for transmitting a respective sidelink data transmission, and the at least two sidelink data transmissions for transmitting a transport block (TB) and at least one retransmission of the TB to the second UE.

Optionally, the reservation signal is transmitted in a different time slot than the at least one sidelink data transmission.

Optionally, the reservation signal is an SCI (sidelink control information).

Optionally, wherein the at least one time-frequency resource is a pattern, and the reservation signal further indicates a periodicity of the pattern.

According to another aspect of the present disclosure, there is provided a method comprising: receiving, by a first user equipment (UE) from a second UE, a reservation signal to indicate at least one time-frequency resource for receiving sidelink data; receiving, by the first UE from the second UE, at least one sidelink data transmission using the at least one time-frequency resource indicated by the reservation signal, the reservation signal having been transmitted before the at least one sidelink data transmission signal so that a third UE may detect the first reservation signal to avoid using the at least one time-frequency resource indicated in the first reservation signal.

Optionally, the at least one time-frequency resource is at least two time-frequency resources in different time slots, and the at least one sidelink data transmission is at least two sidelink data transmissions, each of the time-frequency resources for receiving a respective sidelink data transmission, and the at least two sidelink data transmissions for receiving a transport block (TB) and at least one retransmission of the TB from the second UE.

Optionally, the reservation signal is received in a different time slot than the at least one sidelink data transmission.

Optionally, the reservation signal is an SCI (sidelink control information).

Optionally, the at least one time-frequency resource is a pattern, and the reservation signal further indicates a periodicity of the pattern.

According to another aspect of the present disclosure, there is provided method comprising: receiving, by a first user equipment (UE) from a second UE, a first reservation signal to indicate at least one time-frequency resource for at least one sidelink data transmission from the second UE to a third UE, the first reservation signal for the first UE to avoid using the at least one time-frequency resource; and transmitting, by the first UE, a second reservation signal indicating at least one time-frequency resource for at least one sidelink transmission from the first UE to another UE.

Optionally, the method further comprises: prior to transmitting the second reservation signal, selecting the at least one time-frequency resource for the at least one sidelink transmission from the first UE to the another UE based on the first reservation signal.

Optionally, the method further comprises: prior to receiving the first reservation signal, selecting at least one time-frequency resource for the at least one sidelink transmission from the first UE to the another UE; after receiving the first reservation signal, determining a collision between the at least one time-frequency resource of the first reservation signal and the at least one time-frequency resource selected for the at least one sidelink transmission from the first UE to the other UE; re-selecting the at least one time-frequency resource for the at least one sidelink transmission from the first UE to the other UE; and wherein the second reservation signal indicates the re-selected at least one time-frequency resource for the at least one sidelink transmission from the first UE to the other UE.

According to another aspect of the present disclosure, there is provided a user equipment (UE) comprising: a processor and memory, the UE configured to: transmit, by the UE to a second UE, a first reservation signal to indicate at least one time-frequency resource for transmitting sidelink data; transmit, by the UE to the second UE, at least one sidelink data transmission using the at least one time-frequency resource indicated by the first reservation signal; wherein the UE is configured to transmit the first reservation signal before the at least one sidelink data transmission signal so that a third UE may detect the first reservation signal and use the first reservation signal to avoid using the at least one time-frequency resource indicated in the first reservation signal.

Optionally, the at least one time-frequency resource is at least two time-frequency resources in different time slots, and the at least one sidelink data transmission is at least two sidelink data transmissions, each of the time-frequency resources for transmitting a respective sidelink data transmission, and the at least two sidelink data transmissions for transmitting a transport block (TB) and at least one retransmission of the TB to the second UE.

Optionally, the UE is configured to transmit the reservation signal is in a different time slot than the at least one sidelink data transmission.

Optionally, the reservation signal is an SCI (sidelink control information).

Optionally, the at least one time-frequency resource is a pattern, and the reservation signal further indicates a periodicity of the pattern.

According to another aspect of the present disclosure, there is provided a UE comprising: a processor and memory, the UE configured to: receive, by the user equipment (UE) from a second UE, a reservation signal to indicate at least one time-frequency resource for receiving sidelink data; receive, by the UE from the second UE, at least one sidelink data transmission using the at least one time-frequency resource indicated by the reservation signal, the reservation signal having been transmitted before the at least one sidelink data transmission signal so that a third UE may detect the first reservation signal to avoid using the at least one time-frequency resource indicated in the first reservation signal.

Optionally, the at least one time-frequency resource is at least two time-frequency resources in different time slots, and the at least one sidelink data transmission is at least two sidelink data transmissions, each of the time-frequency resources for receiving a respective sidelink data transmission, and the at least two sidelink data transmissions for receiving a transport block (TB) and at least one retransmission of the TB from the second UE.

Optionally, the reservation signal is received in a different time slot than the at least one sidelink data transmission.

Optionally, the reservation signal is an SCI (sidelink control information).

Optionally, the at least one time-frequency resource is a pattern, and the reservation signal further indicates a periodicity of the pattern.

According to another aspect of the present disclosure, there is provided a UE comprising: a processor and memory, the UE configured to: receive, by the user equipment (UE) from a second UE, a first reservation signal to indicate at least one time-frequency resource for at least one sidelink data transmission from the second UE to a third UE, the first reservation signal for the first UE to avoid using the at least one time-frequency resource; and transmit, by the UE, a second reservation signal indicating at least one time-frequency resource for at least one sidelink transmission from the first UE to another UE.

Optionally, the UE is further configured to: prior to transmitting the second reservation signal, select the at least one time-frequency resource for the at least one sidelink transmission from the first UE to the another UE based on the first reservation signal.

Optionally, the UE is further configured to: prior to receiving the first reservation signal, select at least one time-frequency resource for the at least one sidelink transmission from the first UE to the another UE; after receiving the first reservation signal, determine a collision between the at least one time-frequency resource of the first reservation signal and the at least one time-frequency resource selected for the at least one sidelink transmission from the first UE to the other UE; re-select the at least one time-frequency resource for the at least one sidelink transmission from the first UE to the other UE; and wherein the second reservation signal indicates the re-selected at least one time-frequency resource for the at least one sidelink transmission from the first UE to the other UE.

According to one aspect of the present disclosure, there is provided a method comprising: transmitting a non-control signal based transmission resource indication signal (NCSBTRIS) to indicate a transmission resource; transmitting at least one sidelink data transmission using the transmission pattern indicated by the NCSBTRIS.

In some embodiments, the NCSBTRIS is one of: a reference signal; a sounding reference symbol; a channel state information-reference symbol; a preamble; a synchronization signal; a reservation signal.

In some embodiments, transmitting a NCSBTRIS comprises transmitting a demodulation reference symbol (DMRS).

In some embodiments, the NCSBTRIS is associated with a transmission resource based on one or a combination of two or more of: DMRS sequence; root or initialization for DMRS sequence; DMRS location; orthogonal cover code used for DMRS.

In some embodiments, the method further comprises randomly selecting a DMRS from a DMRS pool associated with the transmission pattern; wherein transmitting the DMRS comprises transmitting the randomly selected DMRS.

In some embodiments, the method further comprises transmitting the NCSBTRIS multiple times in association with multiple sidelink data transmissions, or transmitting a NCSBTRIS tuple in association with multiple sidelink data transmissions, for repetition identification or soft combining of the multiple sidelink data transmissions.

In some embodiments, the NCSBTRIS transmitted multiple times or the NCSBTRIS tuple indicates redundancy version for the multiple sidelink data transmissions.

In some embodiments, transmitting the NCSBTRIS occurs before transmitting the at least one sidelink data transmission.

In some embodiments, the NCSBTRIS is transmitted in a first window, and the at least one sidelink data transmission is transmitted in a second window that is after the first window.

In some embodiments, the method further comprises randomly selecting a resource within the first window to send the NCSBTRIS; or transmitting the NCSBTRIS using a predefined resource within the first window.

In some embodiments, the method further comprises detecting NCSBTRIS transmitted by other UEs during the first window, and selecting a transmission pattern based on avoiding collision with other UE's transmission patterns.

In some embodiments the NCSBTRIS is transmitted in a first window, and an initial data transmission is also transmitted in the first window, and remaining repetitions are transmitted in a second window that is after the first window.

In some embodiments, the method further comprises detecting NCSBTRIS transmitted by other UEs during the first window, and selecting a transmission pattern for the remaining repetitions based on avoiding collision with other UE's transmission patterns.

In some embodiments, the method further comprises wherein indicating the transmission resource comprises indicating a transmission pattern.

According to another aspect of the present disclosure, there is provided a method comprising: obtaining a transmission pattern to use for a sidelink data transmission, wherein the obtained transmission pattern is a default or configured initial transmission pattern or a transmission pattern selected from among a pattern pool; performing sensing to determine transmission pattern(s) used by other UE(s); based on the sensing, selecting between the obtained transmission pattern and a different transmission pattern within a pattern pool to use for the sidelink data transmission; transmitting the sidelink data transmission using the selected transmission pattern, and also transmitting an indication of the selected transmission pattern.

In some embodiments, performing sensing comprises one or a combination of: Measurement of RSRP; Measurement of RSSI; Detection of DMRS sequences; Measurement of energy on particular possible transmit resources; Detection of transmission pattern indication signal; Detection of SCI.

In some embodiments, performing sensing comprises sensing during a first time window that precedes a time window for data transmission.

In some embodiments performing sensing comprises sensing during a first time window that is also used for initial transmissions precedes a time window for remaining data transmissions.

In some embodiments, the method further comprises performing short term sensing immediately before sidelink data transmission, and based on the sensing determining whether to perform the transmission or delay the transmission.

According to another aspect of the present disclosure, there is provided a method comprising: receive a non-control signal based transmission resource indication signal (NCSBTRIS) to indicate a transmission resource; receive at least one sidelink data transmission using the transmission pattern indicated by the NCSBTRIS.

In some embodiments, the NCSBTRIS is one of: a reference signal; a sounding reference symbol; a channel state information-reference symbol; a preamble; a synchronization signal; a reservation signal.

In some embodiments, receiving a NCSBTRIS comprises receiving a demodulation reference symbol (DMRS).

In some embodiments, the NCSBTRIS is associated with a transmission resource based on one or a combination of two or more of: DMRS sequence; root or initialization for DMRS sequence; DMRS location; orthogonal cover code used for DMRS.

In some embodiments, the method further comprises receiving the NCSBTRIS multiple times in association with multiple sidelink data transmissions, or receiving a NCSBTRIS tuple in association with multiple sidelink data transmissions, for repetition identification or soft combining of the multiple sidelink data transmissions.

In some embodiments, the NCSBTRIS transmitted multiple times or the NCSBTRIS tuple indicates redundancy version for the multiple sidelink data transmissions.

In some embodiments, receiving the NCSBTRIS occurs before receiving the at least one sidelink data transmission.

In some embodiments, the NCSBTRIS is received in a first window, and the at least one sidelink data transmission is received in a second window that is after the first window.

In some embodiments, the NCSBTRIS is received in a first window, and an initial data transmission is also received in the first window, and remaining repetitions are received in a second window that is after the first window.

In some embodiments, indicating the transmission resource comprises indicating a transmission pattern.

According to another aspect of the present disclosure, there is provided a user equipment comprising: a processor and memory; at least one antenna; wherein the user equipment is configured to: perform the method as described herein.

According to another aspect of the present disclosure, there is provided a user equipment comprising: a processor and memory; at least one antenna; wherein the user equipment is configured to: perform the method as described herein as a transmitting user equipment and to perform the method as described herein as a receiving user equipment.

BRIEF DESCRIPTION OF THE DRAWINGS

Embodiments of the disclosure will now be described with reference to the attached drawings in which:

FIG. 2 is an example of transmitting an advance indication signal in a dedicated indication signal window to indicate transmission resource or pattern for SL transmission;

FIG. 3 is an example of transmitting an advance indication signal to indicate transmission resource or pattern for SL transmission, where the advance signal is transmitted in an initial transmission window also available for initial transmissions;

FIG. 10 is example of partially overlapping TFRP pools.

DETAILED DESCRIPTION

Figure 1A:
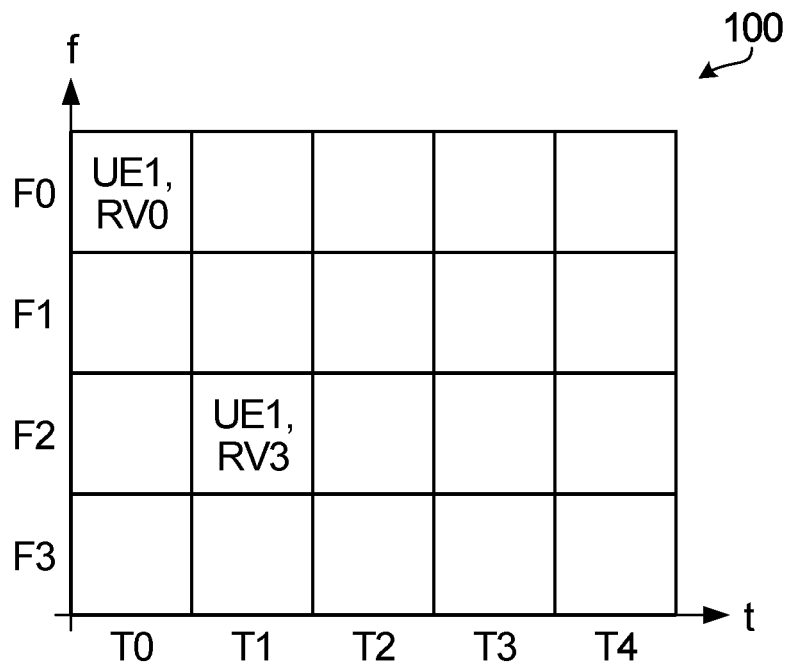
FIG. 1A is a block diagram illustrating an example of a two-dimensional resource configuration for grant-free SL transmission.

For illustrative purposes, specific example embodiments will be explained in greater detail below in conjunction with the figures. It should be appreciated, however, that the present disclosure provides many applicable concepts that can be embodied in a wide variety of specific contexts. The specific embodiments discussed are merely illustrative and do not limit the scope of the present disclosure.

A conventional long-term evolution (LTE) SL transmission scheme relies on the concept of a resource pool (RP) defining a pool of communication resources that are available for SL communication. The SL is used for both transmit (Tx) and receive (Rx) functions, and a UE may not be able to both transmit and receive communications at the same time, i.e., it can either transmit or receive sidelink communications at one time. This is because UEs are typically half duplex devices.

The conventional LTE SL transmission scheme includes two transmission modes, known as "mode 3" and "mode 4".

In mode 3, a BS transmits to a UE control information using a "downlink control information" (DCI), which schedules time-domain and frequency-domain communication resources (from an RP) for SL transmission. This scheduling may be performed dynamically or semi-persistently using a DCI. However, scheduling of the SL transmission resources by the BS results in latency. Before the UE can transmit on the SL, it must wait for the DCI from the BS. Furthermore, the dynamic nature of the resource scheduling increases the signaling overhead associated with an SL transmission.

In mode 4, the UE autonomously selects resources within the RP, which avoids the latency issue associated with mode 3. However, the RP in mode 4 is not designed to prevent two UEs from selecting the same resource for SL communication. Since there is no direct control, by the network or the BS, of the resources used for SL communication within the RP, two UEs can cause a message collision by independently selecting the same resource. When this happens, the collision may cause reliability issues for the message, which may not be successfully decoded by the intended receivers.

In conventional UL transmissions, whether they be grant-based or "grant-free," the BS knows the parameters and resources used for the UL transmission because those parameters and resources are configured by the BS. This greatly reduces the complexity of the UL transmission, and particularly it does not require uplink control signaling to be associated with the UL transmission to indicate the transmission resources and parameters used for the UL transmission. In a grant-based UL transmission, for example, the required transmission parameters are typically communicated to a UE via a Physical Downlink Control Channel (PDCCH). The base station is aware of the identity of the UE sending the UL transmission using the granted UL resources, because the BS specifically granted those UL resources to that UE in a scheduling grant sent in PDCCH.

In a conventional UL grant-free transmission from a UE to a BS, for example, different UEs could send UL transmissions using UL communication resources configured semi-statically in UE-specific RRC signaling, without specifically requesting use of the resources in a dynamic manner, and without receiving a dynamic scheduling grant of the resources sent in a DCI by the BS. The grant-free transmission typically achieves low latency and reduced scheduling overhead as compared to the grant-based UL transmission. The BS receiving the grant-free UL transmission knows the communication parameters of the UL transmission because the BS has previously configured the UE performing the grant-free UL transmission semi-statically. Although, the BS may not have complete information about which UE, if any, is sending a grant-free UL transmission at a particular moment of time if multiple UEs are configured to be able to access the same resources, the BS is able to detect the grant-free transmissions and determine the UE based on the configuration parameters (e.g. using DMRS parameters and time and frequency resources).

While it is also desirable to achieve the advantages of grant-free transmission for SL communications between UEs, the nature of SL communications creates particular challenges for implementing grant-free transmissions. In contrast to UL grant-free transmissions where the receiver is a BS with high awareness, both the transmitter and receiver are UEs in SL grant-free transmissions. Therefore, the receiving UE is not aware of the transmitting UE's configuration parameters, such as which UE is transmitting, the ultimate target of the data (e.g., another UE), the time-domain and frequency-domain communication resources used for the transmission, and other control information.

Grant-free transmissions are sometimes called "grant-less", "schedule free", or "schedule-less" transmissions. Grant-free SL transmission can also be referred to as SL "transmission without grant", "transmission without dynamic grant", "transmission without dynamic scheduling", or "transmission using configured grant", for example.

The term collision as used herein refers to a situation in which multiple UEs are transmitting signals using the same communication resource or overlapping communication resources, such that the multiple UEs' transmission signals may interfere with each other, making it more difficult for the respective receivers to decode the transmitted signals. For example, a collision occurs when UEs that are transmitting in the same time-frequency resource in the same time slot.

Collision represents an example of a scenario in which an SL transmission by a UE might not be received by another UE. Half duplex devices, as noted above, can either transmit or receive sidelink communications at any time. A half duplex UE cannot receive an SL transmission while it is also transmitting. SL transmission patterns could also or instead be used to mitigate the problem of missing signals from one or more other UEs due to transmitting at the same time.

In some embodiments, an SL transmission pattern represents a sparse set of communication resources. More generally, the SL transmission pattern defines how communication resources are to be used by UEs for SL transmissions, and can be designed to enable all UEs in a cooperation group to communicate with each other even if some transmissions are transmitted in a grant-free manner (i.e., without dynamic scheduling). This could be especially useful in applications such as V2X and UE cooperation, and/or other applications as well.

In some embodiments, the transmission pattern indicates a number of "on" or usable resources within the time window of the transmission pattern. In a time-frequency based transmission pattern, for example, the UE transmits using time-frequency communication resources in time slots that are designated as "on" time slots by the transmission pattern, and receives in time slots that are not designated as "on" time slots (or are otherwise designated as "off" time slots) by the transmission pattern. In this sense, a transmission pattern could be considered a form of "on-off" pattern in some embodiments.

The transmission pattern (or, in some embodiments, the on-off pattern) may define the resources used for a number of transmissions of a transport block (TB). The transmissions may include the initial transmission and retransmissions of the same TB. The initial transmission and retransmission of the TB may sometimes also be referred to as repetitions. In some embodiments, each transmission pattern may represent transmissions of one transport block (TB), i.e., a UE should start initial transmission of a TB at the first "on" slot in the transmission pattern, and continue repetition of the TB on all the "on" slots until the end of the "on" slots defined by the transmission pattern. In this type of application, a transmission pattern (or on-off pattern) could be considered a repetition pattern. In some embodiments, a UE may also listen to other UE's transmissions in the "off" slots defined by the transmission pattern or any slot that is not defined as an "on" slot in the transmission pattern. As described above, reference signals may be used to accommodate SL data transmission. Some embodiments described herein outline signaling mechanisms that could be used to for grant-free SL communications using transmission patterns.

In some embodiments, a UE is configured to use a transmission pattern defining or otherwise indicating communication resources that are allotted or allocated to the UE over a specific time interval for SL communications. Other UEs are similarly configured to use respective transmission patterns over this time interval. A UE can transmit and receive SL transmissions within a time interval using these communication resources according to its transmission pattern. A half-duplex UE might still be transmitting at certain times while other UEs are transmitting, but transmission patterns could be designed to provide an opportunity for each UE to receive SL transmissions from all other UEs at least once during the time interval if all UEs are configured and transmitting during the time interval using their respective transmission patterns.

Time is one dimension that may be used in defining communication resource usage in a transmission pattern. Other dimensions, such as frequency, code, and/or signature are also contemplated.

Transmission patterns may belong to a transmission pattern set or pool that is common to a group of UEs. RRC signaling may be used to configure the transmission pattern for a UE and/or a transmission pattern pool. Transmission pattern pool may also be signaled by broadcast signaling (e.g. in SIB).

FIG. 1A is a block diagram illustrating an example of a two-dimensional resource configuration for grant-free SL transmission. This is an example of a transmission pattern. FIG. 1 illustrates a resource grid 100, which includes frequency-domain resources F0, F1, F2 and F3, and time-domain resources T0, T1, T2, T3 and T4. Each combination of frequency-domain resource and time-domain resource forms a communication resource for SL transmission. FIG. 1A also illustrates a transmission pattern for a UE1. Resource grid 100 indicates a time-frequency communication resource for two transmissions by UE1, as well as a redundancy version (RV) (RV0 or RV3) in a label on each communication resource.

In FIG. 1A, UE1 is configured with a transmission pattern, which explicitly defines the transmission repetition number as well as the communication resources for each repetition. Each repetition may also be associated with an RV, which can be predefined or preconfigured (e.g. configured using a UE specific RV sequence indicating the associated RV for each repetition). A single UE index is used to indicate both time-domain and frequency-domain resources in FIG. 1A. In general, a UE index corresponds to a specific UE or a UE group. The communication resources assigned to UE1 form the transmission pattern for UE1.

The resource grid 100 has a frequency-domain length of 4 and a time-domain length of 5. In the time-domain, T0 to T4 could be slots, mini-slots, symbols, or any other quantization or unit of time. In the frequency-domain, F0 to F3 could be frequency sub-channels, combinations of sub-channels, resource blocks, resource block groups (RBGs), bandwidth parts (BWPs), subcarriers, a number of subcarriers, carriers or any other quantization or unit of frequency. Different frequency domain sub-channels are just an example. Sub-channels can instead be associated with different layers of non-orthogonal multiple access (NOMA), different pilot resources, and/or other resources. Although shown as time-domain resources and frequency-domain resources in FIG. 1A, in general the transmission pattern could also or instead include code-domain resources (such as sparse code multiple access), space-domain resources, and/or different demodulation reference signals (DMRS). Moreover, the transmission patterns are not limited to two-dimensions, and therefore could include a number of dimensions greater or less than two.

In some embodiments, frequency-domain resources, pilots and layer index may be associated with time-domain signatures. For example, as an alternative to using a UE index, the resource grid 100 could indicate only the time-domain signature or time-domain transmission pattern, and other dimensions (e.g. the frequency-domain dimension) may be derived from it.

Figure 1B:
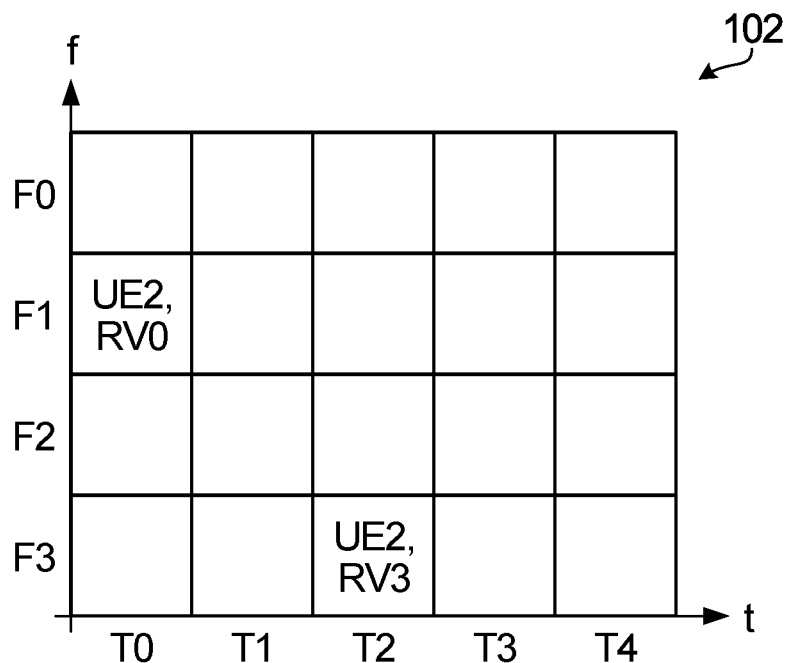
FIGS. 1B-1K are block diagrams illustrating other examples of two-dimensional resource configurations for grant-free SL transmission.
Figure 1C:
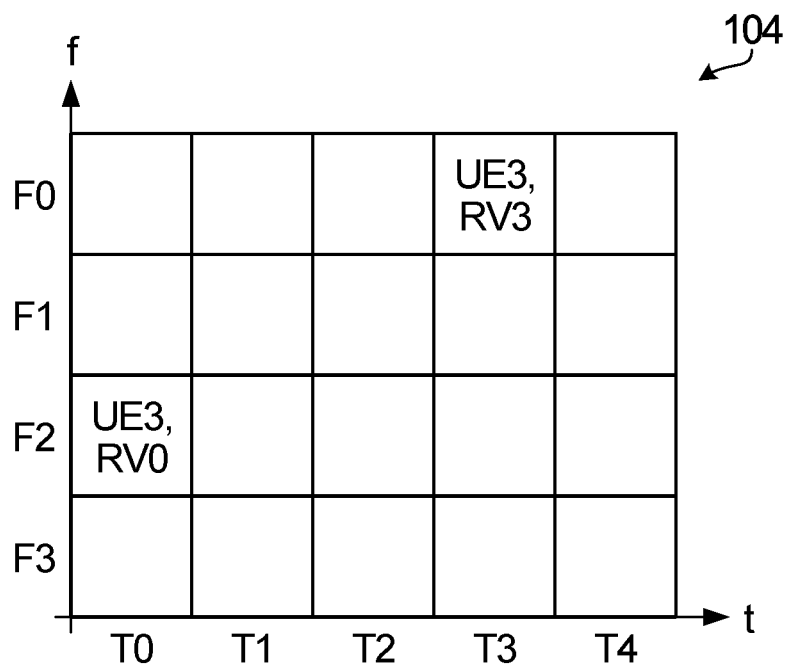
Figure 1D:
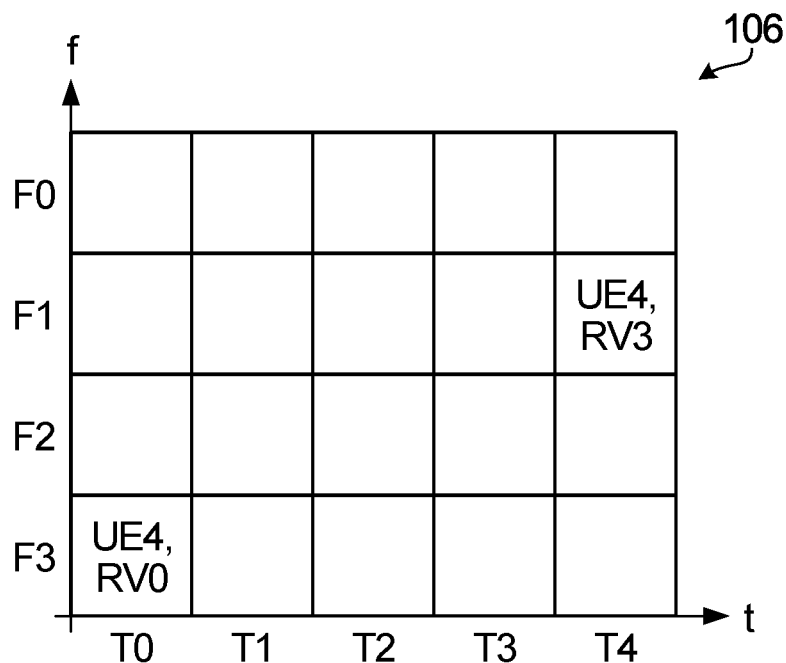
Figure 1E:
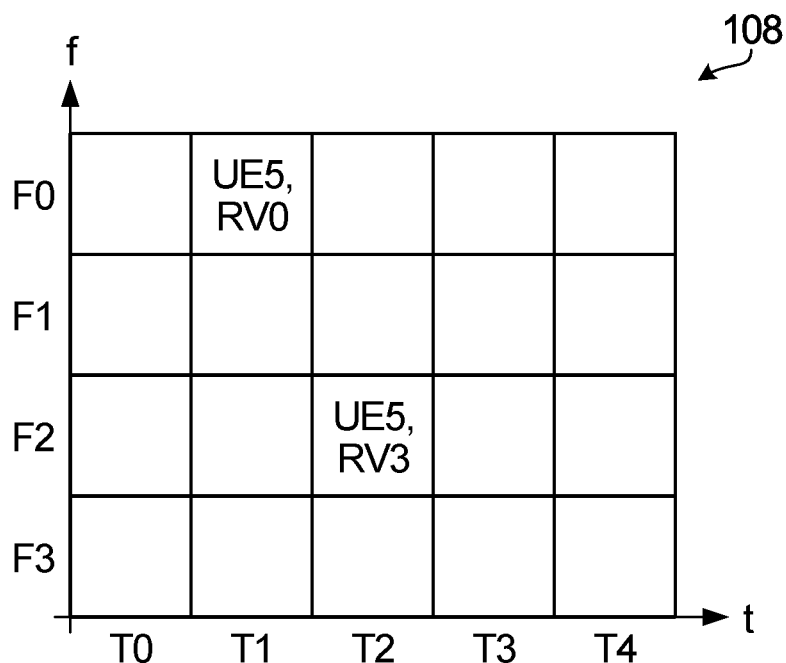
Figure 1F:
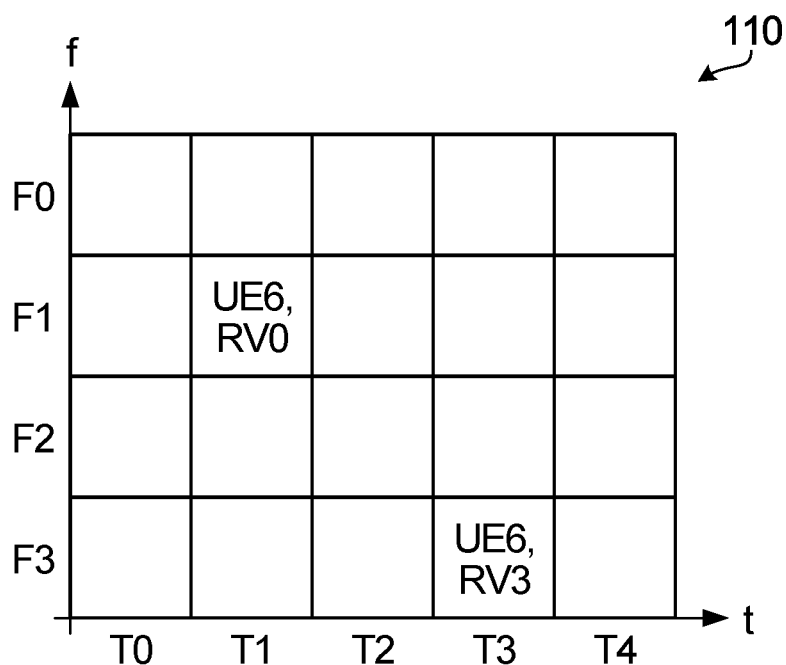
Figure 1G:
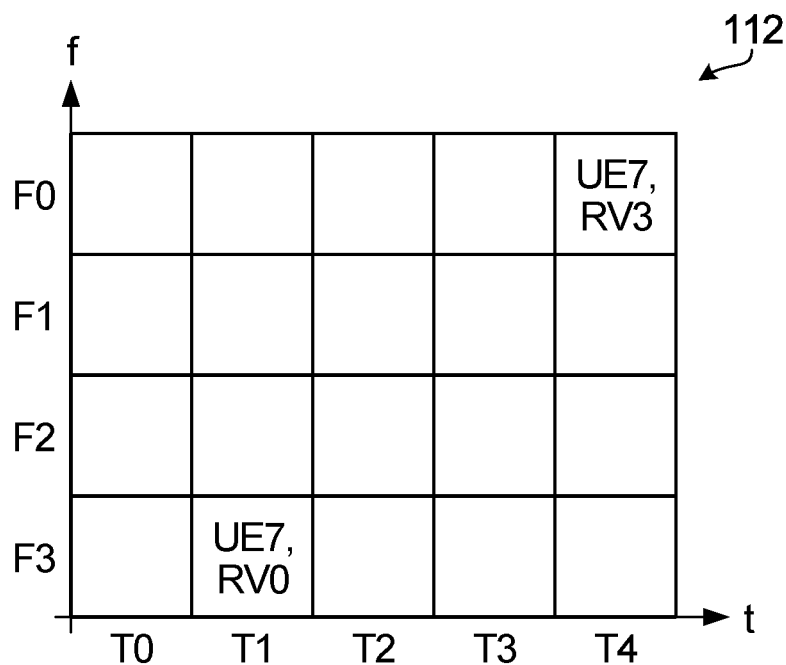
Figure 1H:
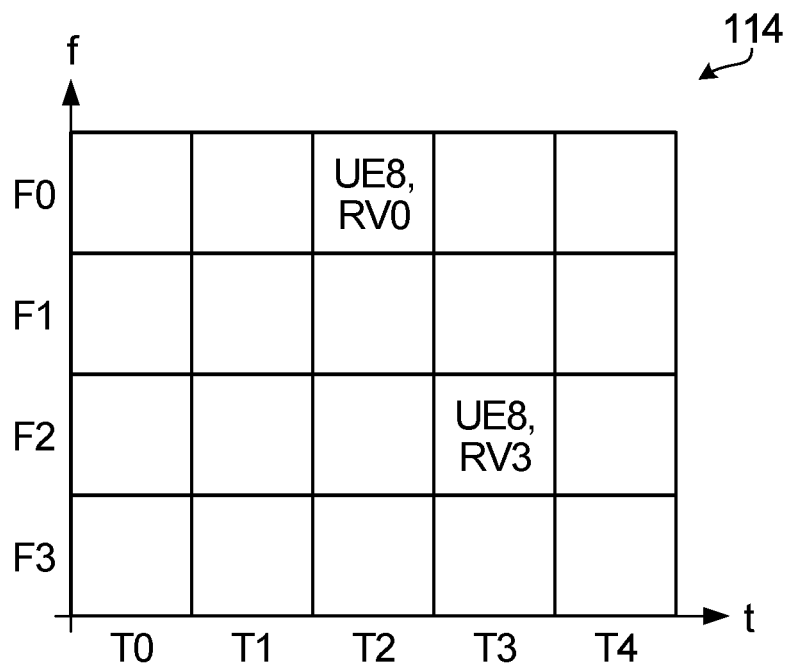
Figure 1I:
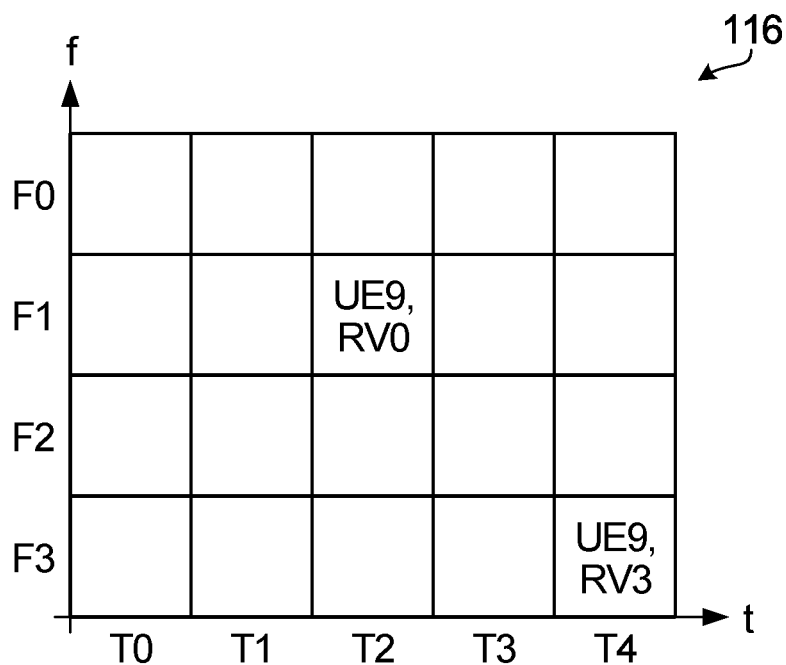
Figure 1J:
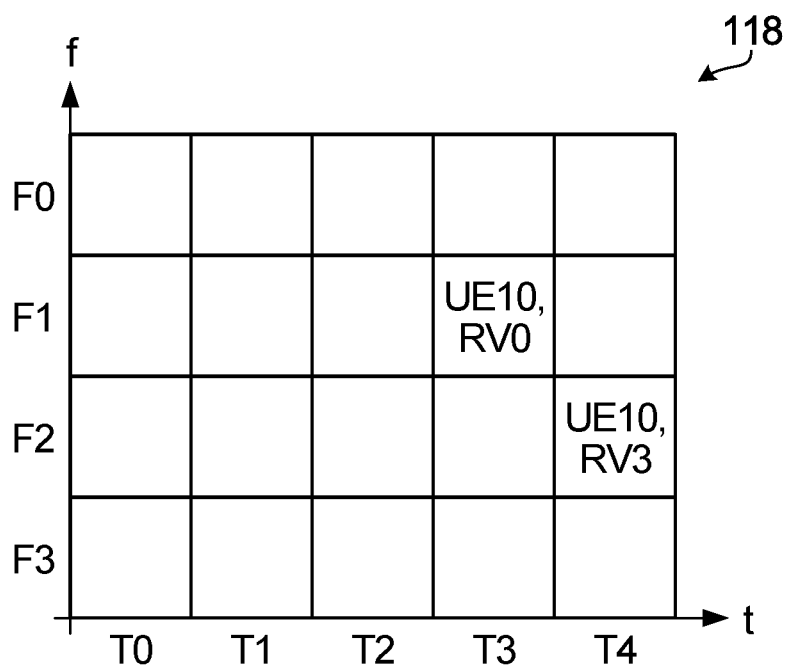

FIG. 1B is another block diagram illustrating an example of a two-dimensional resource configuration for grant-free SL transmission. FIG. 1B illustrates a resource grid 102. Resource grid 102 includes the same frequency-domain resources F0, F1, F2 and F3, and time-domain resources T0, T1, T2, T3 and T4 as resource grid 100 in FIG. 1A. FIG. 1B also illustrates a transmission pattern for UE2.

Resource grid 102 indicates time-frequency communication resources for two transmissions by UE2, as well as a redundancy version (RV0 or RV3) in a label on each communication resource. These time-frequency communication resources define the transmission pattern for UE2. The time-frequency communication resources indicated in resource grid 102 for UE2 are different from the time-frequency communication resources indicated in resource grid 100 for UE1.

FIGS. 1C, 1D, 1E, 1F, 1G, 1H, 1I and 1J are further block diagrams illustrating other examples of two-dimensional resource configurations for grant-free SL transmission. FIGS. 1C, 1D, 1E, 1F, 1G, 1H, 1I and 1J illustrate resource grids 104, 106, 108, 110, 112, 114, 116 and 118, respectively, each resource grid including the same frequency-domain resources F0, F1, F2 and F3, and time-domain resources T0, T1, T2, T3 and T4 as resource grid 100 in FIG. 1A. Resource grids 104, 106, 108, 110, 112, 114, 116 and 118 each indicate communication resources defining the transmission patterns for UE3, UE4, UE5, UE6, UE7, UE8, UE9 and UE10, respectively, as well as a redundancy version (RV0 or RV3) in a label on each communication resource. Each communication resource indicated by resource grids 100, 102, 104, 106, 108, 110, 112, 114, 116 and 118 are unique.

Figure 1K:
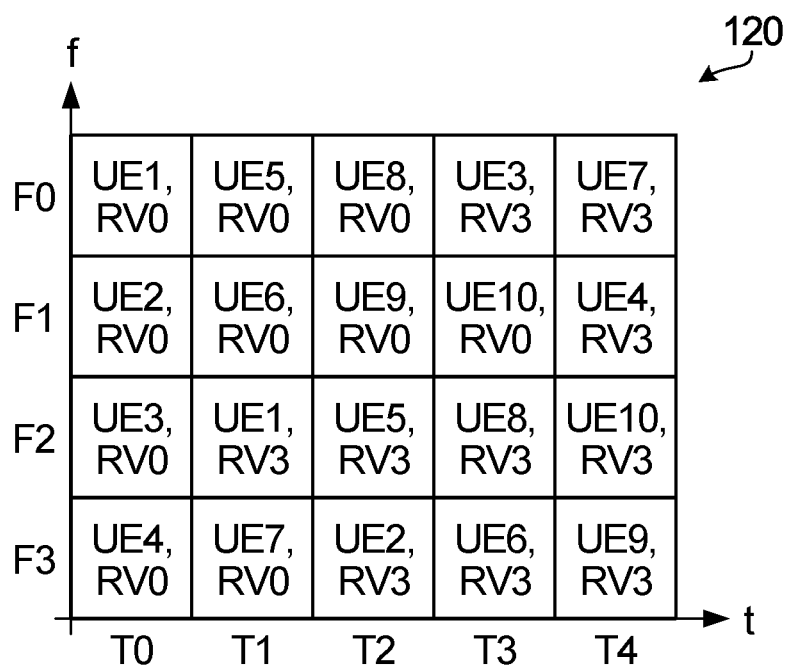

FIG. 1K is yet another block diagram illustrating a two-dimensional resource configuration for grant-free SL transmission. FIG. 1K illustrates resource grid 120, which also includes the same frequency-domain resources F0, F1, F2 and F3, and time-domain resources T0, T1, T2, T3 and T4 as resource grid 100 in FIG. 1A. Resource grid 120 is a superposition of resource grids 100, 102, 104, 106, 108, 110, 112, 114, 116 and 118. Therefore, resource grid 120 may be considered to indicate a transmission pattern pool, which includes the transmission patterns for UE1-UE10.

The communication resources illustrated in FIG. 1K are used for SL transmission by respective UEs, according to their transmission patterns. In general, each communication resource represents a potential transmission of a transport block (TB). The same TB is used in each transmission by a UE over the length of a transmission pattern. In FIG. 1K, according to their respective transmission patterns, each UE transmits a TB twice over the length of the configured transmission pattern, therefore the repetition number of each transmission pattern is 2. As explained below, this allows each UE receive at least one transmission of the TB by the other UEs.

Embodiments Making Use of Reference Symbol for Pattern Indication

For V2X transmission, it is important to indicate the transmission pattern, or more generally, the time frequency resource for the SL data transmissions. The receiver UE may be able to use the information from the pattern indication to do decoding of data, combining data from different transmissions or choosing its own transmission or transmission pattern to avoid collision with the detected pattern.

As indicated above, one existing way to indicate the transmission pattern is to indicate it in sidelink control information (SCI) transmitted in a sidelink control channel. SCI may be associated with one or more of the SL data transmissions However, including the information in the SCI may incur significant overhead.

In accordance with some embodiments of the disclosure, a non-control signal based transmission resource indication signal (NCSBTRIS) is transmitted to indicate transmission resources, for example a transmission pattern, for a sidelink transmission.

In some embodiments, the NCSBTRIS is a reference signal, such as a demodulation reference signal (DMRS). Other specific examples of reference signals that can be used for the NCSBTRIS include sounding reference signal (SRS), channel state information (CSI)-RS.

In some embodiments, the NCSBTRIS is a preamble.

In some embodiments, the NCSBTRIS is a synchronization signal.

All of these examples of NCSBTRIS have other purposes, such as purposes related to channel measurement, channel estimation or synchronization but here are also used to implicitly indicate the transmission pattern.

In the following description, the assumption is that the NCSBTRIS is a DMRS, and various options for using the DMRS are provided. It should be understood that these same options apply to the other signals that might be used for the NCSBTRIS, including other reference signals, preambles, and synchronization signals.

In some embodiments, to indicate the transmission pattern, DMRS has a predefined or a configured mapping/association to the pattern. The association/mapping between DMRS or DMRS parameters and the transmission pattern (or transmission pattern index) may be predefined. The association/mapping may also be configured to the UE through signaling (e.g. through RRC signaling, system information or preconfigured to the UE). With the mapping, if a UE detects a DMRS, the UE can then derive which pattern the transmitter is using. The mapping that is used to associate DMRS to specific patterns may be based on one or a combination of DMRS sequence, different roots/initialization for the DMRS sequence, different cyclic shift values, DMRS time and frequency locations (e.g. different symbols), different orthogonal cover code used, different antenna ports, different code division multiplexing (CDM) groups, different DMRS patterns or some other aspect of the DMRS.

DMRS is mainly used for channel estimation. An example of DMRS can be the DMRS used in 3GPP NR uplink described in 3GPP TS 38.211 V15.0.0. Another example of DMRS would be the UL DMRS used in LTE. In SL transmission, similar DMRS structure as LTE or NR uplink may be used. DMRS can be generated using a sequence, such as gold sequence (or m-sequence) or Zadoff Chu sequence. The sequence is usually calculated using a root or an initialization value. The sequence may be further applied with a phase shift (some time called a cyclic shift). For example, in LTE, a phase shift is applied to the Zadoff Chu sequence used for uplink DMRS, and the phase shift is usually called cyclic shift and can be indicated using a cyclic shift value or cyclic shift index. In LTE, the value of cyclic shift is indicated in DCI as one of 8 possible choice of cyclic shift value using 3 bits.

The sequence may be further multiplied using an orthogonal cover codes (OCC). The sequence may be further precoded and then mapped to time frequency resources and modulated to a reference signal and transmitted over the air. Orthogonal cover codes may includes orthogonal cover codes applied to time domain or frequency domain. DMRS sequence may be also applied to time frequency locations (e.g in different resource elements) with different allocation patterns. DMRS signal transmitted from the same time frequency resource may interfere with each other, therefore it is desirable to design different DMRS that can multiplexed together with minimum interference to each other. This can be achieved by using DMRS sequence with low correlation among each other. Another way to acheme multiplexing of different DMRS is to use code division multiplexing (CDM), time division multiplexing (TDM) or frequency division multiplexing (FDM). Orthogonal cover codes are an example of CDM. Different allocation patterns (map DMRS sequence to different time frequency locations) to create different DMRS can be considered TDM or FDM. In some scenarios, the combination of different DMRS properties may be characterized by a single DMRS parameters, for example in new radio (NR) cellular system, different CDM, TDM, FDM patterns and different OCC used may be indicated using a single parameter as antenna port. The combination of DMRS sequence, different allocation patterns (TDM, FDM), different orthogonal cover codes used (different CDM pattern) and different DMRS locations together generates different DMRS.

The DMRS parameter may be known by the UE, then UE can detect DMRS without blind detection. In some case, the exact DMRS parameter may not be known by the UE. In this case, UE can blind decoding DMRS to find which DMRS and which DMRS parameters are used. There is usually a finite choice of DMRS parameters that are known to the UE. An example way to do DMRS detection is to use different choices of potential DMRS sequences to correlate with the DMRS at the potential location of DMRS and find which one gives the highest correlation by finding the output signal with the highest energy.

For example, In 4G LTE, a Zadoff-Chu (ZC) root sequence may be used to generate a pool of DMRS sequences generated according to the following formula $$X_{m,k}^{ZC} = e^{-j\pi q \frac{k(k+1)}{M_{ZC}}},$$

$0 \leq k < M_{ZC}$. Where $M\_\{zc\}$ is the length of the root sequence, q is the index of the reference Zadoff-Chu sequence or the root of the sequence. The reference pilot sequence of given length is the cyclic extension of the original Zadoff-Chu sequence. The cyclic shift (phase rotation in frequency domain) of the reference sequence creates multiple orthogonal pilot sequences: $X_k = X_k^{ZC} e^{-j\alpha k}$, In LTE $\alpha = 2m\pi/12$, $m \in \{0, 1, \ldots, 11\}$. An orthogonal cover codes may be applied to the two symbols used for DMRS for each subframe. In this scenario, the root q, cyclic shift value alpha, and the orthogonal cover codes used are all properties of the DMRS. And UE can do DMRS detection and find out which root, which cyclic shift value and which orthogonal cover codes are used. And one or a combination of these properties (roots, cyclic shift and orthogonal cover codes) may be associate with the transmission pattern. After receiving UE detecting the DMRS, UE knows the transmission pattern that the UE who transmit DMRS use by using the association between DMRS and the transmission pattern.

In another example, in NR, if transform precoding for PUSCH is not enabled, the reference-signal sequence r(m) shall be generated according to $$r(m) = \frac{1}{\sqrt{2}}(1 - 2 \cdot c(2m)) + j\frac{1}{\sqrt{2}}(1 - 2 \cdot c(2m+1)).$$

where the pseudo-random sequence c(i) is a defined by a length-31 Gold sequence and initialized using some given parameters. There are limited number of gold sequences that can be used to generate the DMRS. After precoding, the sequence is mapped to the time frequency resource using the following:
The UE shall map the sequence $\tilde{r}^{(p_j)}(m)$ to physical resource elements according to $$a_{k,l}^{(p_j,\mu)} = \beta_{DMRS} w_f(k') \cdot w_t(l') \cdot \tilde{r}^{(p_j)}(2n+k')$$

-continued $$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

where $w_f(k')$, $w_t(l')$, and $\alpha$ are given by the specification defined in 3GPP TS 38.211, one of the example table for a configuration type is shown below.

TABLE 6.4.1.1.3-1

Parameters for PUSCH DM-RS configuration type 1.

| p | CDM group | Δ | $w_f(k')$ k'=0 | $w_f(k')$ k'=1 | $w_t(l')$ l'=0 | $w_t(l')$ l'=1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

Here Δ value represents different DMRS time-frequency mapping patterns or different TDM/FDM scheme (FDM for this particular example where different value represents mapping to different subcarriers), which also corresponds to different CDM group in this example. $w_f(k')$ and $w_t(l')$ are frequency domain and time domain orthogonal coer codes used. They are all determined using a single antenna port value p that can be indicated to the UE. The different gold sequence, orthogonal cover codes (OCC), different mapping pattern together generates different DMRS. And all the DMRS properties, such as different sequence, time and frequency domain OCC, CDM group, DMRS mapping pattern, antenna ports, DMRS locations (such as which DMRS symbols are used) and a combination of them may be used to associate with the transmission pattern. Again, there may be a limited number of DMRS choices and after UE detects DMRS, UE can find all the DMRS parameters and obtain the transmission pattern information using the known DMRS association with the pattern.

Figure 9:
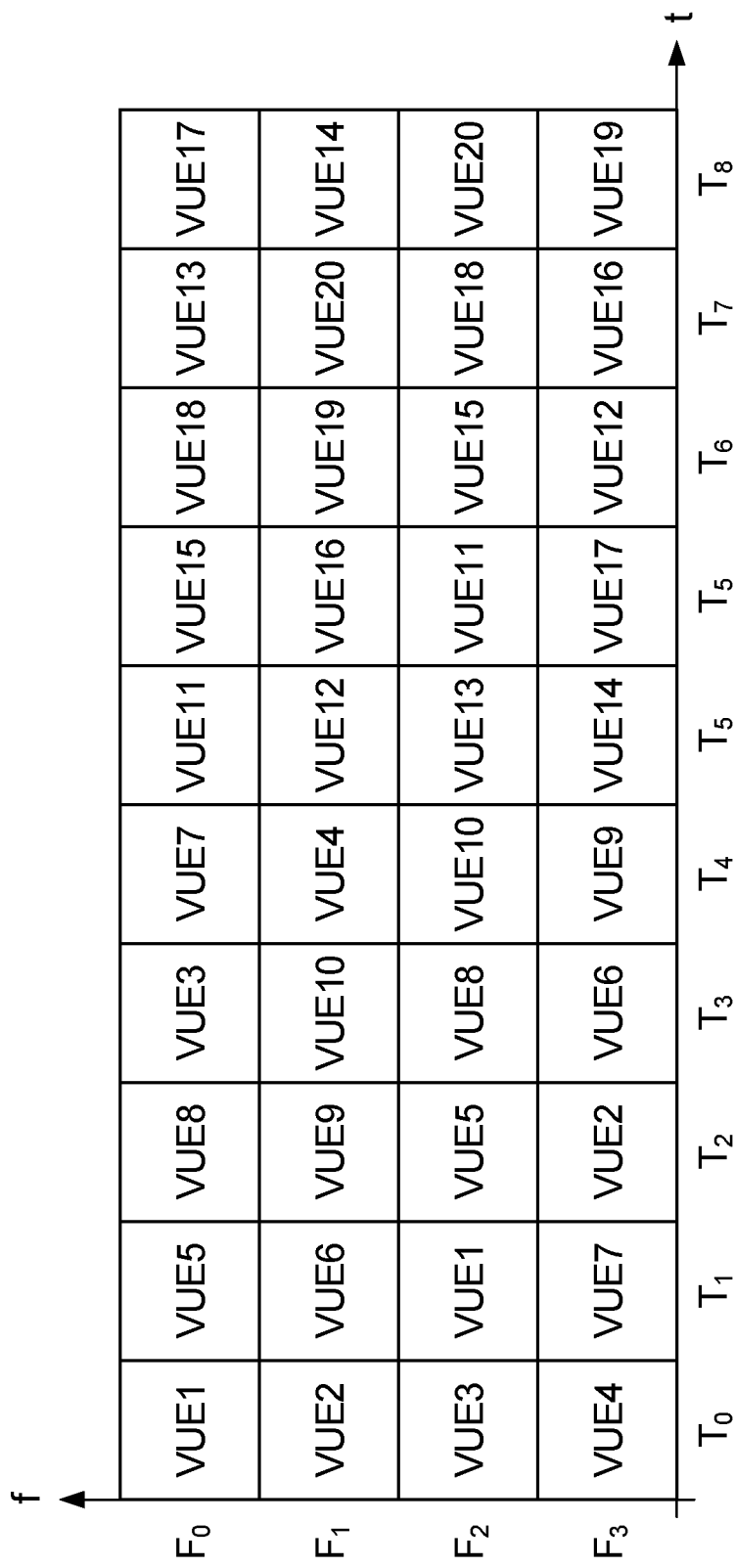
FIG. 9 is an of pattern pool replication in the time domain.

An example of transmission pattern in a given time frequency grid is shown in FIG. 9, where the same VUE index in the figure represents a pattern and VUE index is the pattern index. In the example, there are 20 patterns that do not overlap with each other in such a 10 time slots×4 frequency partitions grid.

In one example, DMRS association with the pattern may be achieved through a fixed mapping between a DMRS index and a pattern index. The DMRS index is an index among a pool of DMRS that can indicate a combination of one or multiple DMRS parameters/properties described earlier. The pattern index can be a known pattern among a pattern pool. For example, if there is 20 DMRS with index p1, p2, . . . p20 there can be a predefined mapping of p1 to pattern 1, p2 to pattern 2. Etc. If there is 40 DMRS with index p1, p2, . . . , p40, there can be a multiple DMRS to one pattern mapping, e.g p1 and p2 to pattern 1, p3 and p4 to pattern 2, . . . etc.

In some embodiment, DMRS may have a fixed association/mapping with the transmission pattern or the time frequency location of the transmissions other than the first transmission of the TB. In some embodiment, DMRS may have a fixed association/mapping with the transmission pattern or the time frequency location of the transmissions other than the first transmission of the TB given the time frequency location of the first transmission of the TB is known.

For example, in some scenario, the first transmission may already be known by the UE and UE may only need to know the location of the rest of transmissions of the TB to do combining to decoding the signal. UE can know the first transmission through decoding of SCI, DMRS, which is associated with a data transmission. In this case, DMRS may only need to map to the pattern of the remaining transmissions given the first transmission. In the pattern pool defined in FIG. 7 above, once UE find an initial transmission, the location of the second transmission is already determined, so detecting DMRS may not even be needed to find the location of the second transmission.

In another example, the pattern pool is defined as in FIG. 10, where the pattern are partially overlapped with each other. In every time frequency resource, there are 3 possible patterns. In this case, if a UE find a first transmission through decoding SCI or DMRS, there may be 3 possibilities of transmission pattern or location of second transmission given the location of the first transmission. In this case, 3 DMRS or DMRS groups may be enough to indicate all possible transmission patterns. For example, DMRS with index p1 or DMRS in group 1 may indicate or have a fixed association of patterns in the top figure of FIG. 8. DMRS with index p2 or DMRS in group 2 may indicate or have a fixed association of patterns in the middle figure of FIG. 8. DMRS with index p3 or DMRS in group 3 may indicate or have a fixed association of patterns in the bottom figure of FIG. 10.

After obtain the pattern information through DMRS mapping, UE can combine the signal from different transmissions through pattern information to decode the signal. This is most useful in the case where the signal is targeting to the UE himself. If the signal is not targeting the UE, UE may use the pattern information to avoid collision with the UE who send the DMRS or pattern indication signal.

In some embodiments, a single pattern can be mapped to multiple DMRS, so a UE may use different DMRS even if it uses the same pattern. The mapping between DMRS and pattern may be predefined or configured by the base station or the network.

In some embodiments, a UE is preconfigured/-configured/predefined with a DMRS pool and the UE randomly selects a DMRS from the DMRS pool. Alternatively, a UE may be configured/preconfigured with a specific DMRS. A DMRS pool/specific DMRS may be defined among the DMRS mapped to the same pattern that is to be indicated using the DMRS.

When multiple DMRS are mapped to the same transmission pattern, to indicate a given transmission pattern, a UE may randomly select the DMRS among the DMRS that can mapped to the pattern.

In some embodiments, a UE also uses multiple transmissions of the same DMRS or a DMRS tuple (a number of DMRS used for multiple transmission/repetitions) for repetition identification for soft combining. For example, repetition of the same transport block (TB) may use the same DMRS or a predefined configured DMRS tuple. DMRS may also be used to indicate redundancy version (RV). So once a UE detects the DMRS, the UE also knows how to combine the repetitions.

An example of DMRS tuple associated with retransmission is shown in the table below, where p11, p21, . . . , p33 are DMRS index. If a UE detects a P11 DMRS, p21 DMRS, p31 DMRS at different time frequency locations, they knows that they corresponds to the initial transmission, $1^{st}$ retransmission or repetition of the TB, $2^{nd}$ retransmission or repetition of the same TB and can combine all 3 transmissions to decode the data signal in sidelink transmission.

| Index for 3-tuple | {P1} Initial | {P2} 1 reT | {P3} 2 reT |
|---|---|---|---|
| 1 | P11 | p21 | p31 |
| 2 | P12 | p22 | p32 |
| 3 | P13 | p23 | p33 |

In some embodiments, the signal that is used to indicate the transmission pattern is transmitted contemporaneously with data transmission. For example, DMRS may be transmitted at the same time or in the same slot as data transmission. In other embodiments, the signal that is used to indicate the transmission pattern is transmitted in advance indicate the transmission pattern. An advance indication signal may be transmitted before the signal transmission occurs, so other UE may detect the indication signal and use it to avoid a conflict. An advance indication signal can be a preamble, a sequence, a RS, a reservation signal, a dedicated transmission pattern indication signal to name a few specific examples. In some embodiments, the advanced indication signal may be considered a control signal.

Advantages of using DMRS to indicate transmission pattern includes at least:

A reduction in overhead: Depending on the total number of patterns, transmitting the transmission pattern information in the SCI may use significant overhead for reliable transmission of SCI. Using DMRS to indicate the pattern can reduce the overhead;

Reliability: Also DMRS may be more reliable and can be easily detected even if there are two UEs using the same resource;

Other UE can quickly decode DMRS to obtain the pattern information.

In another embodiment, a dedicated transmission resource indication signal is used to indicate a transmission resource, such as a transmission pattern, separate from any SCI associated with a specific transmission.

Note that a transmission pattern indicated in an SCI is different than a NCSBTRIS or a dedicated transmission resource indication signal. SCI is a control channel that is associated with a specific SL data transmission, it usually contains information regarding the data transmission such as scheduling information, transmission parameters or source/destination ID.

In contrast, a dedicated transmission resource indication signal does not directly associate with one SL data transmission; rather, the dedicated transmission resource indication signal serves to indicate a transmission pattern for an indefinite number of transmissions subsequent to the indication.

Decoupling the dedicated transmission resource indication signal from a data transmission has a practical benefit over using SCI to indicate the transmission resource(s). If the dedicated transmission resource indication signal is transmitted sufficiently in advance of a data transmission, a receiver may decode the dedicated transmission resource indication signal early enough to avoid data transmission collisions. In contrast, a transmission resource indication over SCI may be insufficiently in advance of the data transmission (which in most cases are defined to be in the same time slot as the SCI) to guarantee that no collision will occur on the data transmission.

The dedicated transmission resource indication signal may be transmitted in a channel separate from the SCI's physical sidelink control channel (PSCCH). For example, this separate channel may be a channel specifically defined for the dedicated transmission resource indication signal; alternatively, this dedicated transmission resource indication signal may be transmitted in a data channel, such as a physical sidelink shared channel (PSSCH).

The dedicated transmission resource indication signal may also be known as a reservation signal. For example, a reservation signal is used for reserving multiple repetitions of a transport block. The dedicated transmission resource indication signal could act as a reservation signal by configuring the repetitions to be the transmission resources or transmission pattern defined by the dedicated transmission resource indication signal.

The dedicated transmission resource indication signal may explicitly or implicitly indicate the transmission resources or transmission pattern. An explicit indication comprises different bit values being uniquely associated with different transmission resources or transmission patterns.

Alternatively, an implicit indication may comprise a sequence index or sequence time-frequency location that is uniquely associated with different transmission resources or transmission patterns. For example, receiving an implicit dedicated transmission resource indication signal involves a UE receiving a certain information sequence. The index and/or time-frequency location of the received sequence is associated with a predefined transmission resource or transmission pattern, allowing the UE to implicitly determine the transmission resource or transmission pattern to be used.

Window for Advanced Transmission of Transmission Pattern Indication Signal

In some embodiments, a specific window is defined for advanced transmission of transmission pattern indication signal. Referring now to FIG. 2, shown is an example of advance transmission of a signal to indicate a transmission pattern. A transmission period T2 is divided into a first period 200 between time 0 and time T0, and a second period 202 between T0 and T2. The first period 200 is available to transmit the transmission pattern indication, referred to as the indication signal window, and the second period 202 is available for data transmission using an indicated transmission pattern, referred to as the data transmission window. T0 and/or T2 may be predefined and known to the UE or configured/preconfigured to the UE.

A fixed indication period T0 within T2 is defined for transmission of the advanced indication signal. In some embodiments, for transmitting the indication signal, the UE randomly selects a resource from a set of possible resources (for example a set of possible time frequency resources and/or code resources) within the indication signal window to send the indication signal. Once UE detects the signal, e.g, find out which sequence is used to transmit the indication signal, UE can find out the transmission pattern that the UE who send the signal plan to use. Additionally, or alternatively, UE may also be configured/preconfigured with a specific time-frequency or code resource within the indication signal window to transmit the indication signal.

In addition, a UE monitors and detects the indication signal(s) transmitted by other UEs within the indication signal window. Based on the detected indication signal(s), the UE can determine the transmission patterns being used by the other UEs. In some embodiments, after the UE detects other indication signals within the indication signal window, the UE then selects a transmission pattern based on avoiding collision with other UE's transmission patterns.

In some embodiments, the transmission pattern pool is defined based on a rule where a first transmission is within a first window, and any retransmissions or further repetitions are in a following window. For example, the first window may have a duration T1, and the second window may have a duration T2-T1, where T2 is the total duration of the first and second windows. An example is shown in FIG. 3 which shows an initial transmission window 320 and a remaining repetition window 322. T1 and/or T2 may be predefined and known to the UE or configured/preconfigured to the UE.

A reference signal such as DMRS, synchronization signal, preamble or SCI or some other indication is used to indicate the transmission pattern used for an initial transmission in the initial transmission window. This indication is transmitted at the same time, same slot or simply insufficiently in advance of the data transmission to allow other UE to avoid collision as the initial transmission. Since the indication is sent at the same time as the data for the first transmission, the transmission pattern for the first transmission is not indicated in advance. As such, another UE may not have time to avoid collision with the associated data transmission after detecting the corresponding indication signal. However the initial transmission window 320 can be used as a sensing window for sensing indications transmitted by other UEs so that the UE can attempt to avoid/increase the probability of avoiding collision for the following repetitions during the remaining repetition window 322. When the window is defined such that all the transmission pattern has the first transmission within window T1, UE only need to monitor the initial transmission within window T1 (through DMRS detection, SCI detection etc.) to obtain the information of retransmissions of the TB for other UEs. Therefore, UE can avoid all the collisions in the second window as no UE is doing initial transmission in the second window while all the intention for retransmission in the second window is detected/known through sensing in the first window with T1

Transmission Pattern Selection

Some embodiments of the disclosure provide methods of selecting a transmission pattern for a sidelink transmission, when the UE has the freedom to select between multiple transmission patterns. The methods include steps of configuring transmission patterns, initialization/pattern selection, pattern indication, and sensing transmission patterns used by other UEs so as to enable the UE to avoid selecting a transmission pattern that is already being used.

Configuration: a UE may have a default transmission pattern or be configured with an initial transmission pattern. A UE may be additionally configured/preconfigured with a transmission pattern pool. The configuration parameters may include one or more of: periodicity, pattern window length, repetition number, time-frequency size of each transmission, and/or other configuration parameters. Periodicity is the periodicity of the resources configured for the UE. Pattern window length is length of windows for patterns transmitted within one TB, example of pattern window length is the time between T0 to T4 or 5 slots for FIG. 7. Repetition number is the number of repetitions/transmission for each transport block (TB). Time frequency size is the size of time frequency resources, e.g. number of slots, RBs or subchannels used for one SL data transmission.

Initialization: a UE may use a default or configured initial transmission pattern as a first selected transmission pattern. Alternatively, if a UE is not configured with an initial pattern, the UE may be randomly select a transmission pattern among pattern pool.

Pattern indication: When the UE transmits a sidelink data signal using the selected transmission pattern, the UE may also indicate the pattern, using any of the previously described methods The indication may be transmitted during the data transmission (e.g. DMRS) or in advance. Alternatively, for this embodiment, the pattern may be indicated in an SCI. Apart from indicating the transmission pattern, SCI may include the general time-frequency resource of the transmission, the indication may further include one or more of periodicity information and reservation (e.g. m TBs to be transmitted in burst) and a priority value. In some other embodiment, SCI may not include time-frequency resource or any scheduling information such as MCS for the SL data transmission. The m TB refers to that the UE plans to transmit m times or m TBs in m resources that any two neighbor resources are spaced apart by a time distance defined by periodicity. Each of the m resources for m TB may include more than 1 transmissions of the TB and therefore can have more than 1 resources. UE may decide to transmit m times and indicate it because the packets in the buffer may need to be transmitted m time. The priority value indicates how important the transmission with respect to other UEs transmissions is.

Sensing: Various sensing procedures are provided. In some embodiments, a UE may do measurement through reference signal received power (RSRP) of data signal, DMRS or SCI, received signal strength indication (RSSI) of data signal, DMRS or SCI or through detection of DMRS sequences, or energy to determine the approximate usage at different possible transmit resources. Based on these measurements, the UE selects a transmission pattern for sidelink transmission. For example, if for one transmission pattern, there is too much transmission or too high an amount of energy detected, the UE may select a different transmission pattern.

In some embodiments, a UE detects the transmission pattern indication signal (DMRS/preamble/advanced indication signal) or detects an SCI to obtain an indication of the transmission patterns used by other UEs. The UE may also obtain one or more of periodicity, m reservation and priority information if included in the transmission pattern indication signal and/or SCI. If the UE has selected a transmission pattern that collides with one of the patterns determined from the transmission pattern indication signal or SCI, the UE may re-select a pattern among the remaining patterns in the pattern pool.

Note that for sensing, a UE may monitor/detect the indication signal in different windows. For example, for the advanced indication signal, a UE may detect them within a first window of duration T0 as described with reference to FIG. 2. For the design in Figure B3 where there is a first transmission having duration T1 during which the indication signal and initial transmissions are transmitted, the UE may detect the indication signals of other UEs within T1 and determine a transmission pattern (for one or more remaining transmissions) within T2.

In some embodiments, the UE is configured to avoid all the transmission patterns it detected within a predefined sensing period. This may be used with or without a condition that the priority of the detected UE is higher than the priority assigned to the UE itself. An example is that the UE detects an indication (e.g. through SCI or DMRS detection) that the transmitting UE plans to transmit m times with periodicity P1, UE may consider any resources located in t+P1*n, where t is the current time, n is the integer between 1 and m a potential resource that used by the transmitting UE therefore may collide if the UE use the same resource. In another embodiment, if a UE B detects a pattern used by UE A through any of the method described within a predefined time window before transmission, even if UE A does not reserve another m resources, UE B may assume UE A may keep using the same pattern and therefore try to avoid use the same pattern in a certain number of subsequent transmissions. Alternatively, UE A may only avoid such potential collision if UE B indicates a higher priority than UE A's transmission priority, which may be predefined or configured or simply known by the UE.

In some embodiments, the UE performs short term sensing immediately before the transmission and determines whether it should perform the transmission or delay the transmission.

For any of the embodiments described above, if changing the transmission pattern can avoid collision, UE may change the pattern. Otherwise, UE may use the same selected pattern for the next transmission.

All of the embodiments described herein focus on the use of transmission patterns. Various embodiments rely on one or more of NCSBTRIS, advanced indication signal (which may be NCSBTRIS or dedicated pattern indication signal, or DCI to indicate the transmission resource for a sidelink transmission. Transmission patterns were introduced above, and examples shown in FIGS. 1A to 1K While the embodiments described have focused on the use of NCSBTRIS or dedicated pattern indication signal or DCI to indicate a transmission pattern, such signals are used to indicate transmission resources, for example, time frequency resources to be used for a sidelink transmission. An indication of a transmission pattern is a specific example of an indication of transmission resources.

In another embodiment, a dedicated transmission resource indication signal is used to indicate a transmission resource, such as a transmission pattern, separate from any SCI associated with a specific transmission.

Note that a transmission pattern indicated in an SCI is different than a NCSBTRIS or a dedicated transmission pattern indication signal. SCI is a control channel that is associated with a specific SL data transmission, it usually contains information regarding the data transmission such as scheduling information, transmission parameters or source/destination ID.

In contrast, a dedicated transmission pattern indication signal does not directly associate with one SL data transmission, but it indicates a transmission pattern for transmissions subsequent to the indication.

The embodiments described mainly use grant-free or configured grant in NR V2X mode 2 as an example, however, the same approaches can also be used for other transmission modes or methods. For example, these approaches may be applicable to UE autonomous transmission based on long term or short term sensing mode, configured grant transmission in Mode 1 etc.

Figure 4:
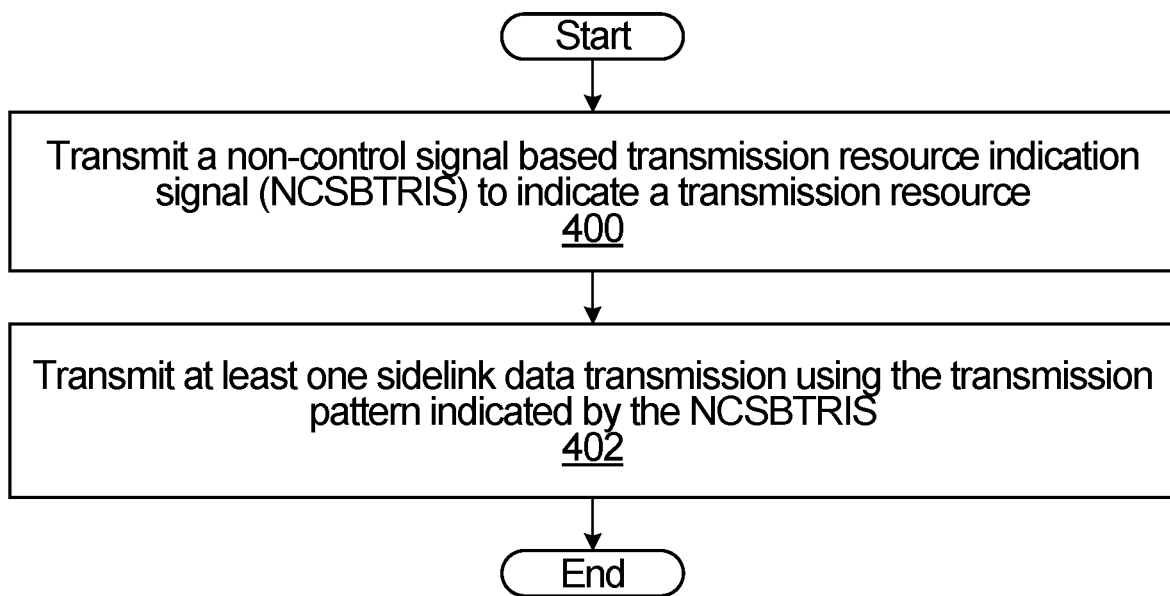
FIGS. 4 and 5 are flowcharts of methods of sidelink transmission provided by embodiments of the disclosure.

FIG. 4 is a flowchart of another method of sidelink transmission provided by an embodiment of the disclosure. The method begins in block 400 with transmitting a non-control signal based transmission resource indication signal (NCSBTRIS) to indicate a transmission resource. Many examples of such a signal have been described above. The method continues in block 402 with transmitting at least one sidelink data transmission using the transmission pattern indicated by the NCSBTRIS. In addition, any of the options/alternatives described herein can be applied with the method of FIG. 4.

Figure 5:
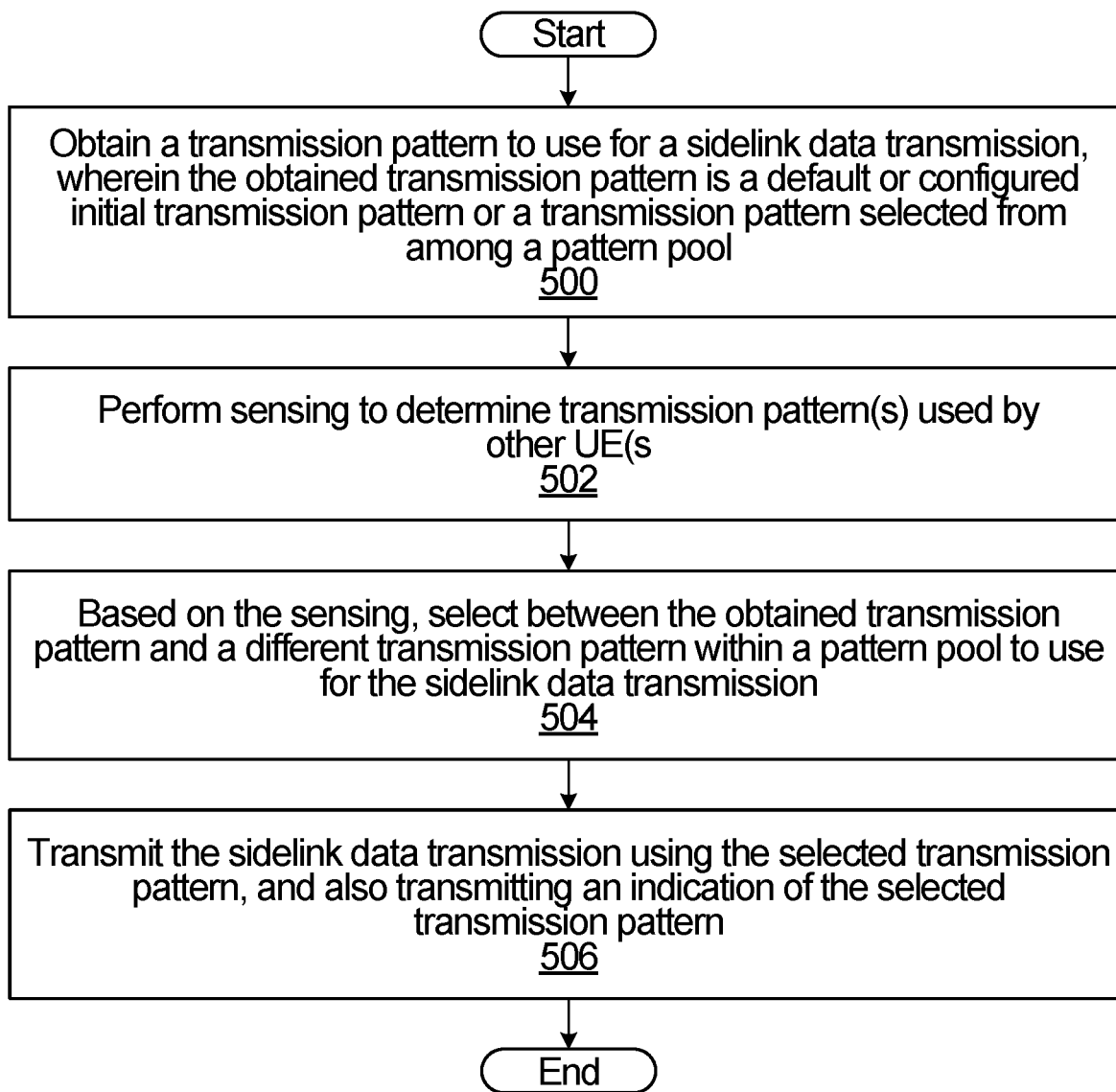

FIG. 5 is a flowchart of another method of sidelink transmission provided by an embodiment of the disclosure. The method begins in block 500 with obtaining a transmission pattern to use for a sidelink data transmission, wherein the obtained transmission pattern is a default or configured initial transmission pattern or a transmission pattern selected from among a pattern pool. The method continue in block 502 with performing sensing to determine transmission pattern(s) used by other UE(s). The method continues in block 504 with, based on the sensing, selecting between the obtained transmission pattern and a different transmission pattern within a pattern pool to use for the sidelink data transmission. The method continues in block 506 with transmitting the sidelink data transmission using the selected transmission pattern, and also transmitting an indication of the selected transmission pattern. In addition, any of the options/alternatives described herein can be employed with the method of FIG. 5.

Figure 6:
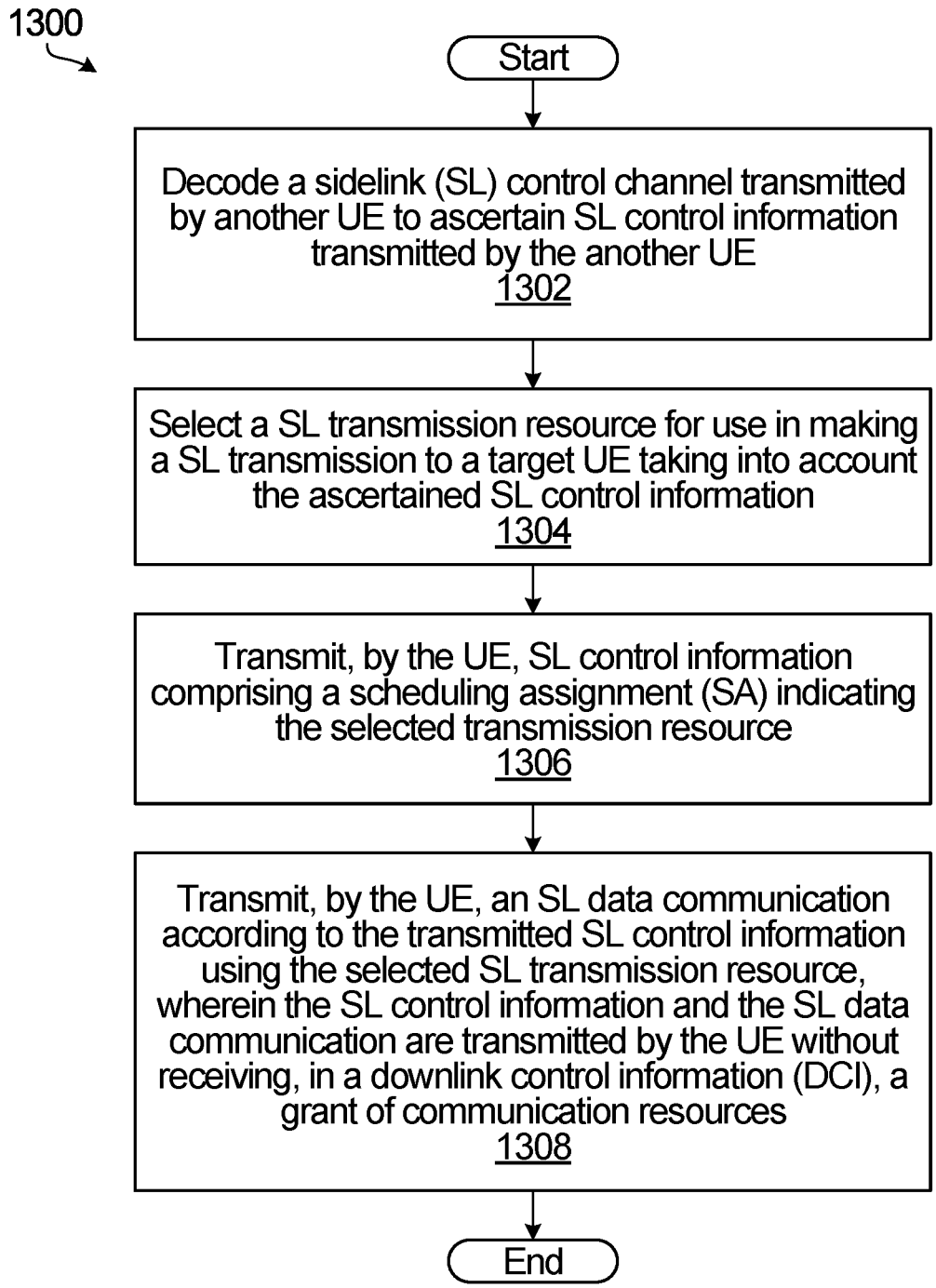
FIG. 6 is a flowchart of a method of sidelink transmission provided by an embodiment of the disclosure.

FIG. 6 is a flow diagram illustrating an example of a method 1300 for sidelink communications. The example method 1300 is illustrative of a method performed by a user equipment (UE), and involves receiving at 1302, by the UE, a message indicating a sidelink (SL) communication resource configuration. In some embodiments, the configuration includes one or more transmission patterns. For example, the SL communication resource configuration could define a transmission pattern pool that includes multiple transmission patterns.

The communication resource configuration could include a transmission pattern pool that includes multiple transmission patterns. As shown at 1304, a method 1300 could include identifying the transmission pattern for SL data communication, from such a transmission pattern pool.

For example, the UE could belong to a UE group and the transmission pattern pool could include a transmission pattern pool configured for the UE group. In these embodiments, the UE could identify a transmission pattern from among the transmission patterns of the transmission pattern pool for the UE group. Identifying the transmission pattern could include identifying the transmission pattern based on a UE index of the UE, and a method could then involve receiving additional signaling assigning the UE index to the UE for example. Such additional signaling could include downlink control information (DCI) signaling.

Identifying the transmission pattern at 1304 could involve the UE selecting the transmission pattern. The transmission pattern selection by the UE could be random by UE. Other selection embodiments are also disclosed herein, that for example, rely on sensing transmissions of other UEs.

The example method 1300 also involves transmitting at 1306, by the UE, NCSBTRIS. The NCSBTRIS may indicate the repetition pattern defined by the SL communication resource configuration. As noted above, in some embodiments the SL communication resource configuration includes a transmission pattern that defines a pattern for transmitting the SL data communication. The transmission pattern could define an initial transmission of a data block and a repetition of the data block. The transmission pattern could further define time resources used for the initial transmission of the data block and the repetition of the data block. The SL communication resource configuration could further include a starting time of the transmission pattern, and the transmission pattern further defines a time gap from the initial transmission of the data block to the repetition of the data block.

The example method 1300 also involves transmitting, by the UE, an SL data communication according to the indicated transmit pattern. This SL data communication could be transmitted to one UE or to multiple UEs. In some embodiments, the SL data communication includes a retransmission of a data communication.

The example illustrated in FIG. 6 represents one possible embodiment. However, other embodiments are also possible which could include additional features, fewer features, and/or different features than those illustrated in FIG. 6.

Figure 7:
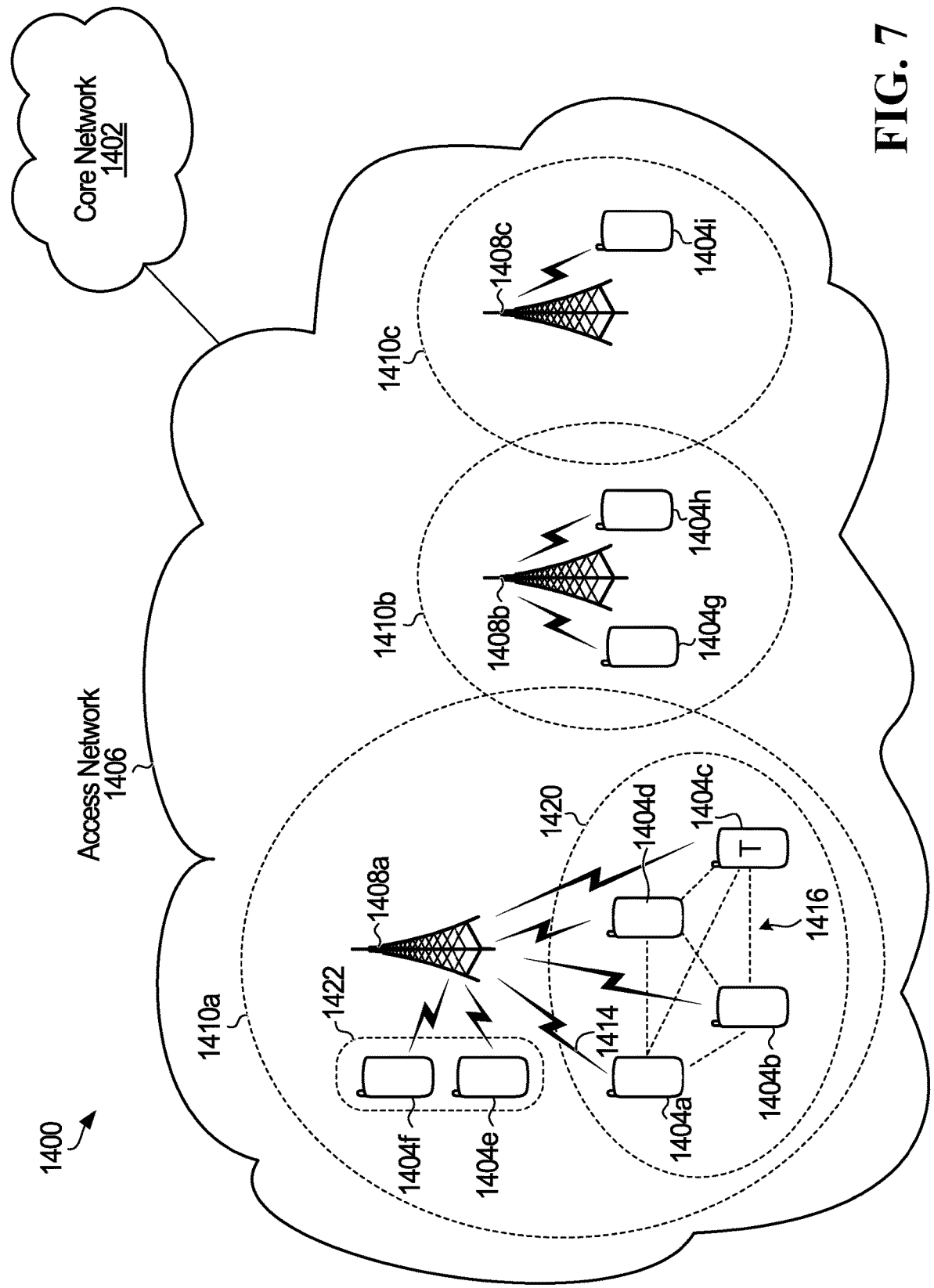
FIG. 7 is a block diagram illustrating an example of a telecommunications network according to one embodiment.

FIG. 7 is a block diagram illustrating an example of a telecommunications network 1400 according to one embodiment, for implementing any one or combination of two or more of the above described methods. The telecommunications network 1400 includes a core network 1402 and an access network 1406. The access network 1406 serves a plurality of UEs 1404a, 1404b, 1404c, 1404d, 1404e, 1404f, 1404g, 1404h, and 1404i. The access network 1406 could be an Evolved Universal Terrestrial Access (E-UTRA) network. As another example, the access network 1406 could be a cloud access network (C-RAN). The access network 1406 includes a plurality of BSs 1408a, 1408b, and 1408c. The BSs 1408a-c each provide a respective wireless coverage area 1410a, 1410b, and 1410c. Each of the BSs 1408a-c could be implemented using a radio transceiver, one or more antennas, and associated processing circuitry, such as antenna radio frequency (RF) circuitry, analog-to-digital/digital-to-analog converters, etc.

Although not illustrated, the BSs 1408a-c are each connected to the core network 1402, either directly or through one or more central processing hubs, such as servers. The BSs 1408a-c could serve as a gateway between the wireline and wireless portion of the access network 1406.

Each one of BSs 1408a-c may instead be referred to as a base transceiver station, a radio BS, a network node, a transmit node, a transmit point, a Node B, an eNode B, or a remote radio head (RRH), depending upon the implementation.

In operation, the plurality of UEs 1404a-i access the telecommunications network 1400 using the access network 1406 by wirelessly communicating with one or more of the BSs 1408a-c.

UEs 1404a-d are in close proximity to each other. Although the UEs 1404a-d can each wirelessly communicate with the BS 1408a, they can also directly communicate with each other, as represented at 1416. The communications represented at 1416 are direct communications between UEs that do not go through an access network component, such as a BS. As shown in FIG. 14, UE to UE communications 1416 are directly between the UEs 1404a-d and are not routed through the BS 1408a, or any other part of the access network 1406. Communications 1416 may also be referred to as lateral communications. In embodiments disclosed herein, UE to UE communications use an SL channel and an SL air interface. On the other hand, a communication between an access network component, such as BS 1408a, and a UE, as in communication 1414, is called an access communication. An access communication occurs over an access channel, which can be a UL or DL channel, and an access communication uses a radio access communication interface, such as a cellular radio access air interface. Access and SL air interfaces may use different transmission formats, such as different waveforms, different multiple access schemes, and/or different radio access technologies. Some examples of radio access technologies that could be used by an access air interface and/or an SL air interface are: Long Term Evolution (LTE), LTE License Assisted Access (LTE-LAA), and WiFi.

By using the SL communications 1416, the UEs 1404a-d may be able to assist with wireless communications between the UEs 1404a-d and the BS 1408a. As one example, if UE 1404c fails to correctly decode a packet received from the BS 1408a, but if UE 1404d is able to receive and correctly decode the packet from the BS 1408a, then UE 1404d could directly transmit the decoded packet to UE 1404c using SL communications 1416. As another example, if UE 1404c moves out of wireless coverage area 1410c, such that UE 1404c can no longer wirelessly communicate with the BS 1408a, then UE 1404b could forward messages between the UE 1404c and the BS 1408a. As another example, UE 1404a and UE 1404c could both receive a signal transmitted from the BS 1408a that carries a packet meant for UE 1404c. UE 1404a may then transmit to UE 1404c, via SL communications 1416, the signal as received by UE 1404a. UE 1404c may then use the information received from UE 1404a to help decode the packet from the BS 1408a. In these examples, capacity and/or coverage may be enhanced through the assistance of UEs 1404a, 1404b, and/or 1404d. V2X communications as referenced herein are an example of SL communications.

The UEs 1404a-d form a UE group 1420. The access network 1406 could assign a group identifier (ID) to the UE group 1420. The UE group ID may allow the access network 1406 to address the UE group 1420 as a whole and distinguish the UE group 1420 from other UE groups. The UE group ID may also be used to broadcast information within the UE group, i.e. address all other UEs within the UE group 1420. The UE group 1420 may form a logical or virtual device mesh in which the members of the UE group 1420 communicate amongst themselves using UE communications over an SL air interface, but the UE group 1420 as a whole acts as a single distributed virtual transceiver with respect to the access network 1406. The UE group ID may be a group radio network temporary identifier (G-RNTI), for example.

When a particular UE in the UE group 1420 is being assisted or is to be assisted with wireless communication between that UE and the BS 1408a, then that particular UE is referred to as the target UE. In the examples above, UE 1404c is being assisted and so is the TUE 1404c. The other UEs 1404a, 1404b, and 1404d in the group 1420 form a cooperation candidate set, which is a set of UEs that may cooperate to help the TUE 1404c. The subset of UEs in the cooperation candidate set that actually assist the target UE 1404c form a cooperation active set. The cooperation active set may be dynamically selected to assist the target UE 1404c. The UEs in the cooperation active set are referred to as cooperating UEs (CUEs). In UE group 1420, UEs 1404a, 1404b, and 1404d form the cooperation candidate set. If UEs 1404a and 1404b actually assist target UE 1404c, then UEs 1404a and 1404b form the cooperation active set and are the CUEs. As UEs 1404a-d move around, some may leave the UE group 1420 and/or other UEs may join the UE group 1420. Therefore, the cooperation candidate set may change over time, e.g., the cooperation candidate set may change semi-statically. The UE group 1420 may also be terminated by the network 1406, e.g., if the network determines that there is no longer a need or opportunity for the UE group 1420 to provide assistance in wireless communication between the BS 908a and members of the UE group 1420.

There may be more than one UE group. For example, UEs 1404e and 1404f in FIG. 7 form another UE group 1422.

Figure 8:
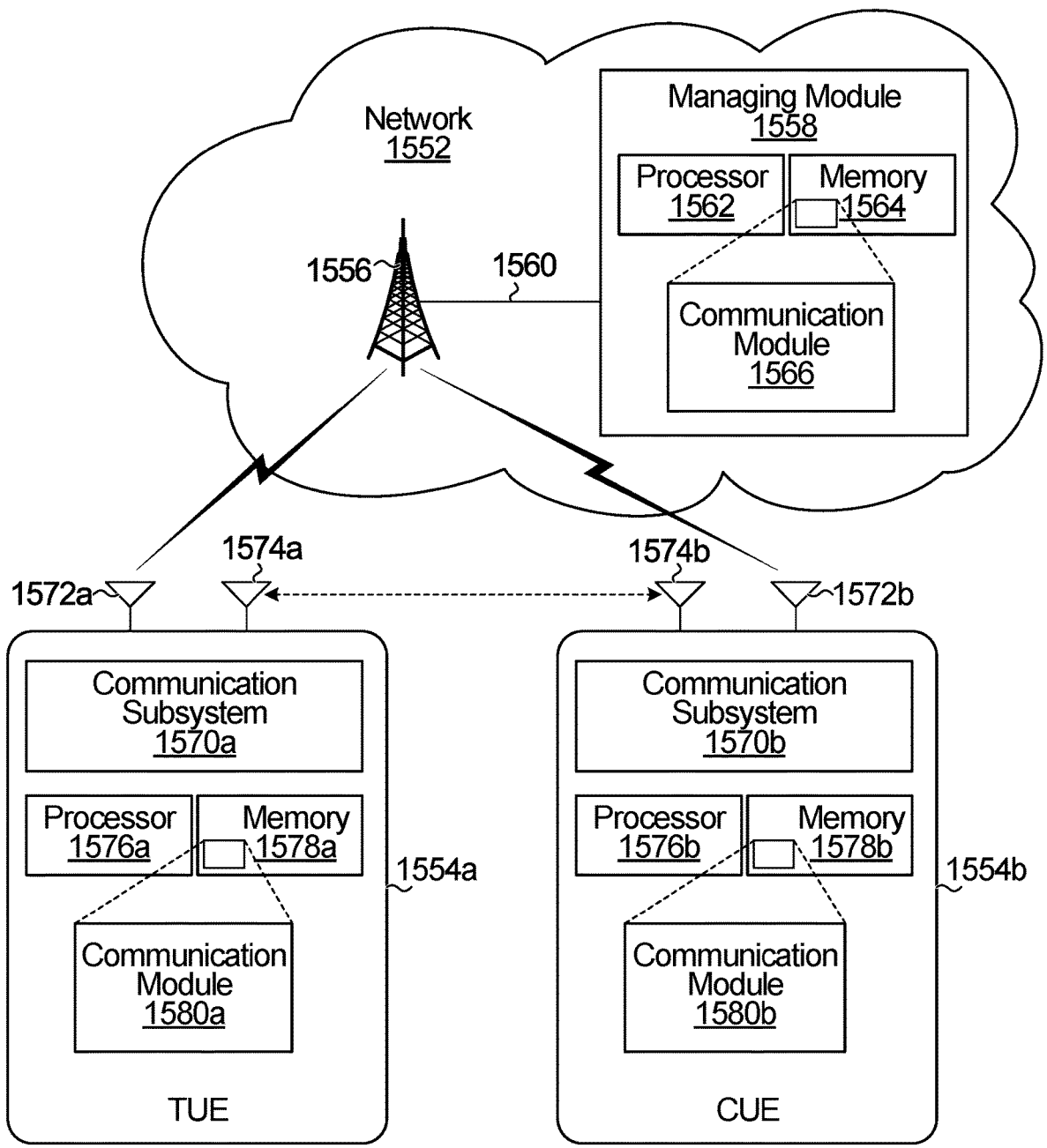
FIG. 8 is a block diagram illustrating an example of a network serving two UEs.

FIG. 8 is a block diagram illustrating an example of a network 1552 serving two UEs 1554a and 1554b, according to one embodiment. The network 1552 may be the access network 1406 from FIG. 7, and the two UEs 1554a and 1554b may be two of the four UEs 1404a-d in FIG. 7, or the UEs 1554a and 1554b may be UEs 1404e and 1404f in FIG. 7. However, more generally this need not be the case, which is why different reference numerals are used in FIG. 8.

The network 1552 includes a BS 1556 and a managing module 1558. The managing module 1558 instructs the BS 856 to perform actions. The managing module 858 is illustrated as physically separate from the BS 1556 and coupled to the BS 1556 via a communication link 1560. For example, the managing module 1558 may be part of a server in the network 1552. Alternatively, the managing module 1558 may be part of the BS 1556.

The managing module 1558 includes a processor 1562, a memory 1564, and a communication module 1566. The communication module 1566 is implemented by the processor 1562 when the processor 1562 accesses and executes a series of instructions stored in the memory 1564, the instructions defining the actions of the communication module 1566. When the instructions are executed, the communication module 1566 causes the BS 1556 to perform the actions described herein so that the network 1552 can establish, coordinate, instruct, and/or control a UE group. Alternatively, the communication module 1566 may be implemented using dedicated circuitry, such as an application specific integrated circuit (ASIC) or a programmed field programmable gate array (FPGA).

The UE 1554a includes a communication subsystem 1570a, two antennas 1572a and 1574a, a processor 1576a, and a memory 1578a. The UE 1554a also includes a communication module 1580a. The communication module 1580a is implemented by the processor 1576a when the processor 1576a accesses and executes a series of instructions stored in the memory 1578a, the instructions defining the actions of the communication module 1580a. When the instructions are executed, the communication module 1580a causes the UE 1554a to perform the actions described herein in relation to establishing and participating in a UE group. Alternatively, the module 1580a may be implemented by dedicated circuitry, such as an ASIC or an FPGA.

The communication subsystem 1570a includes processing and transmit/receive circuitry for sending messages from and receiving messages at the UE 1554a. Although one communication subsystem 1570a is illustrated, the communication subsystem 1570a may be multiple communication subsystems. Antenna 1572a transmits wireless communication signals to, and receives wireless communications signals from, the BS 1556. Antenna 1574a transmits SL communication signals to, and receives SL communication signals from, other UEs, including UE 1554b. In some implementations there may not be two separate antennas 1572a and 1574a. A single antenna may be used. Alternatively, there may be several antennas, but not separated into antennas dedicated only to SL communication and antennas dedicated only to communicating with the BS 1556.

SL communications could be over Wi-Fi, in which case the antenna 1574a may be a Wi-Fi antenna. Alternatively, the SL communications could be over Bluetooth™, in which case the antenna 1574a may be a Bluetooth™ antenna. SL communications could also or instead be over licensed or unlicensed spectrum.

The UE 1554*b* includes the same components described above with respect to the UE 1554*a*. That is, UE 1554*b* includes communication subsystem 1570*b*, antennas 1572*b* and 1574*b*, processor 1576*b*, memory 1578*b*, and communication module 1580*b*.

The UE 1554*a* is designated as a target UE (TUE) and will therefore be called TUE 1554*a*. The UE 1554*b* is a cooperating UE and will therefore be called CUE 254*b*. The CUE 1554*b* may be able to assist with wireless communications between the BS 1556 and TUE 1554*a* if a UE group were to be established that included TUE 1554*a* and CUE 1554*b*. Other communication scenarios are also contemplated, in a V2X application, for example.

UE 1554*a* may be specifically chosen as the target UE by the network 1552. Alternatively, the UE 1554*a* may itself determine that it wants to be a target UE and inform the network 1552 by sending a message to the BS 1556. Example reasons why UE 1554*a* may choose or be selected by the network 1552 to be a target UE include: low wireless channel quality between the UE 1554*a* and the BS 1556, many packets to be communicated between the BS 1556 and the UE 1554*a*, and/or the presence of a cooperating UE that is a good candidate for helping with communications between the BS 1556 and the UE 1554*a*.

UE 1554*a* need not always stay a target UE. For example, UE 1554*a* may lose its status as a target UE once there is no longer a need or desire for assistance with wireless communications between UE 1554*a* and the BS 1556. UE 1554*a* may assist another target UE that is a cooperating UE at a later time. In general, a particular UE may sometimes be a target UE and other times may be a cooperating UE assisting another target UE. Also, sometimes a particular UE may be both a target UE receiving assistance from one or more cooperating UEs and also a cooperating UE itself assisting another target UE. In the examples below, the UE 1554*a* acts only as a target UE, i.e., TUE 1554*a*, and the UE 1554*b* is a cooperating UE to the TUE 1554*a*, i.e., CUE 1554*b*.

FIGS. 7 and 8 illustrate systems in which embodiments could be implemented. In some embodiments, a UE includes a processor, such as 1576*a*, 1576*b* in FIG. 8, and a non-transitory computer readable storage medium, such as 1578*a*, 1578*b* in FIG. 8, storing programming for execution by the processor. A non-transitory computer readable storage medium could also or instead be provided separately, as a computer program product.

In such embodiments, programming could include instructions to: receive, by the UE, a message indicating a sidelink (SL) communication resource configuration to be used by the UE for SL control information and SL data communications between the UE and another UE; transmit, by the UE, SL control information according to the SL communication resource configuration; and transmit, by the UE, an SL data communication according to the SL communication resource configuration, wherein the SL control information and the SL data communication are transmitted by the UE without receiving, in a downlink control information (DCI), a grant of communication resources.

The instructions to transmit the SL control information could include instructions to transmit, by the UE, a scheduling assignment (SA) to the other UE using a communication resource defined in the SL communication resource configuration, the SA indicating communication resources used for transmitting the SL data communication.

The SL communication resource configuration could include a transmission pattern that defines a pattern for transmitting the SL data communication.

The transmission pattern could define an initial transmission of a data block and a repetition of the data block, and could also define time resources used for the initial transmission of the data block and the repetition of the data block.

An SL communication resource configuration could include a starting time of the transmission pattern, and the transmission pattern could further define a time gap from the initial transmission of the data block to the repetition of the data block.

Instructions to transmit the SL control information could include instructions to transmit one instance of the SL control information for both the initial transmission of the data block and the repetition of the data block.

In some embodiments, the instructions to transmit the SL control information include instructions to transmit a separate instance of the SL control information for each of the initial transmission of the data block and the repetition of the data block.

The programming could also include instructions to listen for SL transmissions by other UEs during segments of the transmission pattern other than the SL transmissions.

One or more other UEs may use a different transmission pattern.

The SL communication resource configuration could define a transmission pattern pool that includes multiple transmission patterns, as disclosed herein. The programming could then include instructions to identify the transmission pattern among the transmission patterns of the transmission pattern pool.

For example, the UE could belong to a UE group and the transmission pattern pool could include a transmission pattern pool configured for the UE group. The instructions to identify the transmission pattern could then include instructions to identify the transmission pattern based on a UE index of the UE. The programming could also include instructions to receive additional signaling assigning the UE index to the UE. The additional signaling could be downlink control information (DCI) signaling, for example.

The instructions to identify the transmission pattern could include instructions to select the transmission pattern. The selection of the transmission pattern is random in some embodiments, but other selection options are possible.

The SL communication resource configuration could define a transmission pattern for transmitting the SL control information. The transmission pattern for transmitting the SL control information could be the same or different from the transmission pattern for transmitting the SL data communication.

The SL communication resource configuration could define communication resources used for transmitting the SL control information or the SL data communication, and the communication resources could include at least one of time-domain resources, frequency-domain resources and code-domain resources.

The received message indicating the SL communication resource configuration could be a radio resource control (RRC) message as disclosed by way of example herein, or another type of message such as a Medium Access Control layer Control Element (MAC CE) message.

Embodiments disclosed herein could be useful in mitigating effects of the SL half duplex constraint. Embodiments could also improve the latency and reliability of SL transmissions using a UE specific transmission pattern, and a distributed transmission mode that can be designed to enable all UEs in a cooperation group to communicate with each other even if some transmissions are affected by collisions or the half duplex constraint, for example.

The grant-free transmission modes described herein may be used in NR other than in SL and V2X communication. For example, the grant-free transmission modes may be applicable in unlicensed transmission.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor readable storage medium or media for storage of information, such as computer/processor readable instructions, data structures, program modules, and/or other data. A non-exhaustive list of examples of non-transitory computer/processor readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and nonremovable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor readable storage media.

It should also be appreciated that features disclosed herein could be applied to components other than those specifically referenced by way of example, such as V2X infrastructure components including RSUs (i.e., not just eNBs and UEs). A roadside unit (RSU) is a stationary transportation infrastructure entity (e.g., an entity which can transmit speed notifications) supporting V2X applications that can exchange messages with other entities supporting V2X applications. An RSU is a logical entity which in addition to supporting V2X applications can also provide the functionalities of a network entity (e.g., eNB, gNB, base station), in which case it may be referred to as an e/gNB-type RSU, or a UE, in which case it may be referred to as a UE-type RSU. Network features therefore may apply to e/gNB-type RSUs and UE features may apply to UE-type RSUs.

In some embodiments, in order to support the very low latency (e.g. 3 ms end-to-end delay) and high reliability requirements (e.g. 99.999%) of some NR V2X applications, fast repetition and immediate access to (pre-)configured resources should be supported. LTE Rel. 14/15 V2X supports up to two transmissions of the same TB in LTE SL mode 4, and the retransmission resource may be independently selected from that of the original transmission. NR's higher reliability target requires a higher maximum number of retransmissions, and can be further enhanced by avoiding potential collisions between the SL retransmissions of different UEs. This can be achieved in a grant-free transmission mode, by (pre)-configuring a pool of two-dimensional time/frequency repetition patterns (TFRPs). The TFRPs indicate the time and frequency location of each repetition of a TB. The (pre-)configuration takes into account the UE needs and the radio conditions. The TFRP selection is performed at least once within the periodicity of the (pre-)configured grant resources.

Sensing and Resource Selection

In some embodiments, for mode 2-c UEs (pre-)configured with a UE-specific TFRP, no sensing or resource selection is needed, and for mode 2-c UEs (pre-)configured with TFRP pools, TFRP selection is needed. For the TFRP selection, the UE could either pseudo-randomly select a pattern or may use some knowledge it obtains either from monitoring the PSCCH or from detecting DMRS. For the former, an indication message on the selected TFRP can be transmitted to other UEs to improve the reliability of GF transmissions. While transmitting the explicit indication message results in more reliable detection of selected TFRPs, in case of detecting DMRS there could be a mapping between a detected DMRS and an associated TFRP, so that no TFRP indication message needs to be sent as part of the SCI, thus saving on signaling overhead. Sensing in the form of SCI decoding and/or DMRS detection can lead to a reduction of TFRP collisions. By keeping track of the currently used patterns, the UE can select one pattern that does not collide with the in-use patterns.

Numerous modifications and variations of the present disclosure are possible in light of the above teachings. It is therefore to be understood that within the scope of the appended claims, the disclosure may be practiced otherwise than as specifically described herein.

The invention claimed is:

1. A method comprising:
   transmitting, by a first user equipment (UE) to a second UE, a first reservation signal to indicate at least one time-frequency resource for transmitting sidelink data; and
   transmitting, by the first UE to the second UE, at least one sidelink data transmission using the at least one time-frequency resource indicated by the first reservation signal,
   wherein the first reservation signal is transmitted before the at least one sidelink data transmission,
   wherein a third UE selects the at least one time-frequency resource for second at least one sidelink data transmission from the third UE to another UE prior to receiving the first reservation signal,
   wherein the third UE determines a collision between the at least one time-frequency resource of the first reservation signal and the at least one time-frequency resource selected for the second at least one sidelink data transmission from the third UE to the another UE, wherein the third UE re-selects another at least one time-frequency resource for the second at least one sidelink data transmission from the third UE to the another UE, wherein the third UE transmits the second at least one sidelink data transmission using the another at least one time-frequency resource, and wherein the third UE transmits a second reservation signal indicating the another at least one time-frequency resource for the second at least one sidelink data transmission from the third UE to the another UE.

2. The method of claim 1, wherein the at least one time-frequency resource is at least two time-frequency resources in different time slots, and the at least one sidelink data transmission is at least two sidelink data transmissions, each of the time-frequency resources for transmitting a respective sidelink data transmission, and the at least two sidelink data transmissions for transmitting a transport block (TB) and at least one retransmission of the TB to the second UE.

3. The method of claim 1, wherein the at least one time-frequency resource is a pattern, and the first reservation signal further indicates a periodicity of the pattern.

4. A method comprising:

receiving, by a first user equipment (UE) from a second UE, a reservation signal to indicate at least one time-frequency resource for receiving sidelink data; and receiving, by the first UE from the second UE, at least one sidelink data transmission using the at least one time-frequency resource indicated by the reservation signal, the reservation signal having been transmitted before the at least one sidelink data transmission, wherein a third UE selects the at least one time-frequency resource for second at least one sidelink data transmission from the third UE to another UE prior to receiving the reservation signal, wherein the third UE determines a collision between the at least one time-frequency resource of the reservation signal and the at least one time-frequency resource selected for the second at least one sidelink data transmission from the third UE to the another UE, wherein the third UE re-selects another at least one time-frequency resource for the second at least one sidelink data transmission from the third UE to the another UE, and wherein the third UE transmits the second at least one sidelink data transmission using the another at least one time-frequency resource, and wherein the third UE transmits a second reservation signal indicating the another at least one time-frequency resource for the second at least one sidelink data transmission from the third UE to the another UE.

5. The method of claim 4, wherein the at least one time-frequency resource is at least two time-frequency resources in different time slots, and the at least one sidelink data transmission is at least two sidelink data transmissions, each of the time-frequency resources for receiving a respective sidelink data transmission, and the at least two sidelink data transmissions for receiving a transport block (TB) and at least one retransmission of the TB from the second UE.

6. The method of claim 4, wherein the at least one time-frequency resource is a pattern, and the reservation signal further indicates a periodicity of the pattern.

7. A method comprising:

selecting, by a first user equipment (UE), at least one time-frequency resource for at least one sidelink data transmission from the first UE to another UE;

receiving, by the first UE from a second UE, a first reservation signal to indicate at least one time-frequency resource for another at least one sidelink data transmission from the second UE to a third UE, the first reservation signal for the first UE to avoid using the at least one time-frequency resource indicated by the first reservation signal;

determining, by the first UE, a collision between the at least one time-frequency resource indicated by the first reservation signal and the at least one time-frequency resource selected for the at least one sidelink data transmission from the first UE to the another UE;

re-selecting, by the first UE, another at least one time-frequency resource for the at least one sidelink data transmission from the first UE to the another UE;

transmitting, by the first UE, the at least one sidelink data transmission using the another at least one time-frequency resource; and transmitting, by the first UE, a second reservation signal indicating the another at least one time-frequency resource for the at least one sidelink data transmission from the first UE to the another UE.

8. The method of claim 7, further comprising:

before the selecting the at least one time-frequency resource:

receiving, by the first UE, a prior reservation signal from a fourth UE to indicate a prior at least one time-frequency resource for transmitting sidelink data, wherein the selecting the at least one time-frequency resource includes selecting the at least one time-frequency resource for the at least one sidelink data transmission from the first UE to the another UE to avoid using the prior at least one time-frequency resource indicated by the prior reservation signal.

9. The method of claim 7, wherein the at least one time-frequency resource is at least two time-frequency resources in different time slots, and the at least one sidelink data transmission is at least two sidelink data transmissions, each of the time-frequency resources for transmitting a respective sidelink data transmission, and the at least two sidelink data transmissions for transmitting a transport block (TB) and at least one retransmission of the TB to the second UE.

10. The method of claim 7, wherein the first reservation signal is transmitted in a different time slot than the at least one sidelink data transmission.

11. The method of claim 7, wherein the first reservation signal is an SCI (sidelink control information).

12. The method of claim 7, wherein the at least one time-frequency resource is a pattern, and the first reservation signal further indicates a periodicity of the pattern.

13. A user equipment (UE) comprising:

at least one processor; and a non-transitory memory storing programming, the programming including instructions that, when executed by the at least one processor, cause the UE to:

transmit, by the UE to a second UE, a first reservation signal to indicate at least one time-frequency resource for transmitting sidelink data; and transmit, by the UE to the second UE, at least one sidelink data transmission using the at least one time-frequency resource indicated by the first reservation signal, wherein the UE transmits the first reservation signal before the at least one sidelink data transmission, wherein a third UE selects the at least one time-frequency resource for second at least one sidelink data transmission from the third UE to another UE prior to receiving the first reservation signal, wherein the third UE determines a collision between the at least one time-frequency resource of the first reservation signal and the at least one time-frequency resource selected for the second at least one sidelink data transmission from the third UE to the another UE, wherein the third UE re-selects another at least one time-frequency resource for the second at least one sidelink data transmission from the third UE to the another UE, wherein the third UE transmits the second at least one sidelink data transmission using the another at least one time-frequency resource, and wherein the third UE transmits a second reservation signal indicating the another at least one time-frequency resource for the second at least one sidelink data transmission from the third UE to the another UE.

14. The UE of claim 13, wherein the at least one time-frequency resource is at least two time-frequency resources in different time slots, and the at least one sidelink data transmission is at least two sidelink data transmissions, each of the time-frequency resources for transmitting a respective sidelink data transmission, and the at least two sidelink data transmissions for transmitting a transport block (TB) and at least one retransmission of the TB to the second UE.

15. The UE of claim 13, wherein the at least one time-frequency resource is a pattern, and the first reservation signal further indicates a periodicity of the pattern.

16. A user equipment (UE) comprising:
at least one processor; and
a non-transitory memory storing programming, the programming including instructions that, when executed by the at least one processor, cause the UE to:
receive, by the UE from a second UE, a reservation signal to indicate at least one time-frequency resource for receiving sidelink data; and
receive, by the UE from the second UE, at least one sidelink data transmission using the at least one time-frequency resource indicated by the reservation signal, the reservation signal having been transmitted before the at least one sidelink data transmission,
wherein a third UE selects the at least one time-frequency resource for second at least one sidelink data transmission from the third UE to another UE prior to receiving the reservation signal,
wherein the third UE determines a collision between the at least one time-frequency resource of the reservation signal and the at least one time-frequency resource selected for the second at least one sidelink data transmission from the third UE to the another UE,
wherein the third UE re-selects another at least one time-frequency resource for the second at least one sidelink data transmission from the third UE to the another UE, and
wherein the third UE transmits the second at least one sidelink data transmission using the another at least one time-frequency resource, and
wherein the third UE transmits a second reservation signal indicating the another at least one time-frequency resource for the second at least one sidelink data transmission from the third UE to the another UE.

17. The UE of claim 16, wherein the at least one time-frequency resource is at least two time-frequency resources in different time slots, and the at least one sidelink data transmission is at least two sidelink data transmissions, each of the time-frequency resources for receiving a respective sidelink data transmission, and the at least two sidelink data transmissions for receiving a transport block (TB) and at least one retransmission of the TB from the second UE.

18. The UE of claim 16, wherein the at least one time-frequency resource is a pattern, and the reservation signal further indicates a periodicity of the pattern.

19. A user equipment (UE) comprising:
at least one processor; and
a non-transitory memory storing programming, the programming including instructions that, when executed by the at least one processor, cause the UE to:
select at least one time-frequency resource for at least one sidelink data transmission from the UE to another UE;
receive, from a second UE, a first reservation signal to indicate the at least one time-frequency resource for the at least one sidelink data transmission from the second UE to a third UE, the first reservation signal for the UE to avoid using the at least one time-frequency resource;
determine a collision between the at least one time-frequency resource of the first reservation signal and the at least one time-frequency resource selected for the at least one sidelink data transmission from the UE to the another UE;
re-select another at least one time-frequency resource for the at least one sidelink data transmission from the UE to the another UE; and
transmit the at least one sidelink data transmission using the another at least one time-frequency resource; and
transmit a second reservation signal indicating the another at least one time-frequency resource for the at least one sidelink data transmission from the UE to the another UE.

20. The UE of claim 19, the programming including instructions to:
before the UE selects the at least one time-frequency resource:
receive a prior reservation signal from a fourth UE to indicate a prior at least one time-frequency resource for transmitting sidelink data,
wherein selecting the at least one time-frequency resource includes selecting the at least one time-frequency resource for the at least one sidelink data transmission from the UE to the another UE to avoid using the prior at least one time-frequency resource indicated by the prior reservation signal.

21. The UE of claim 19, wherein the at least one time-frequency resource is at least two time-frequency resources in different time slots, and the at least one sidelink data transmission is at least two sidelink data transmissions, each of the time-frequency resources for transmitting a respective sidelink data transmission, and the at least two sidelink data transmissions for transmitting a transport block (TB) and at least one retransmission of the TB to the second UE.

22. The UE of claim 19, wherein the first reservation signal is transmitted in a different time slot than the at least one sidelink data transmission.

23. The UE of claim 19, wherein the first reservation signal is an SCI (sidelink control information).

24. The UE of claim 19, wherein the at least one time-frequency resource is a pattern, and the first reservation signal further indicates a periodicity of the pattern.

* * * * *